(12) United States Patent
Ghosh

(10) Patent No.: US 12,537,777 B2
(45) Date of Patent: Jan. 27, 2026

(54) DYNAMICALLY ASSIGNING MACHINES TO TRAFFIC GROUPS BASED ON EDGE CAPACITY AND MACHINE PRIORITY

(71) Applicant: VMware LLC, Palo Alto, CA (US)

(72) Inventor: Chandan Ghosh, Bengaluru (IN)

(73) Assignee: VMware LLC, Palo Alto, CA (US)

( * ) Notice: Subject to any disclaimer, the term of this patent is extended or adjusted under 35 U.S.C. 154(b) by 173 days.

(21) Appl. No.: 18/373,589

(22) Filed: Sep. 27, 2023

(65) Prior Publication Data

US 2025/0016115 A1  Jan. 9, 2025

(30) Foreign Application Priority Data

Jul. 6, 2023 (IN) .............................. 202341045514

(51) Int. Cl.
| | |
|---|---|
| *G06F 15/173* | (2006.01) |
| *H04L 41/147* | (2022.01) |
| *H04L 47/125* | (2022.01) |
| *H04L 47/80* | (2022.01) |

(52) U.S. Cl.
CPC .......... *H04L 47/805* (2013.01); *H04L 41/147* (2013.01); *H04L 47/125* (2013.01)

(58) Field of Classification Search
None
See application file for complete search history.

(56) References Cited

U.S. PATENT DOCUMENTS

| | | | | |
|---|---|---|---|---|
| 8,396,458 | B2* | 3/2013 | Raleigh | G06Q 20/32 |
| | | | | 709/224 |
| 11,553,502 | B2* | 1/2023 | Bisaria | H04W 24/02 |
| 2018/0331885 | A1* | 11/2018 | Raymond | H04L 41/0897 |
| 2021/0373967 | A1* | 12/2021 | Wei | H04L 67/1008 |
| 2022/0110021 | A1* | 4/2022 | Livne | H04W 28/0942 |
| 2022/0253335 | A1* | 8/2022 | Bequet | G06N 3/084 |

* cited by examiner

*Primary Examiner* — Phuoc H Nguyen
(74) *Attorney, Agent, or Firm* — Kim & Stewart LLP

(57) ABSTRACT

Some embodiments provide a novel method for associating machines of a first network with gateways that connect the machines to an external second network. The method assigns first and second sets of machines to first and second traffic groups that are associated with first and second gateways. Based on statistics regarding data message load on the first gateway, the method identifies a first machine to reassign from a first traffic group to the second traffic group. The method reassigns the first machine to the second traffic group to reduce data message load on the first gateway.

20 Claims, 22 Drawing Sheets

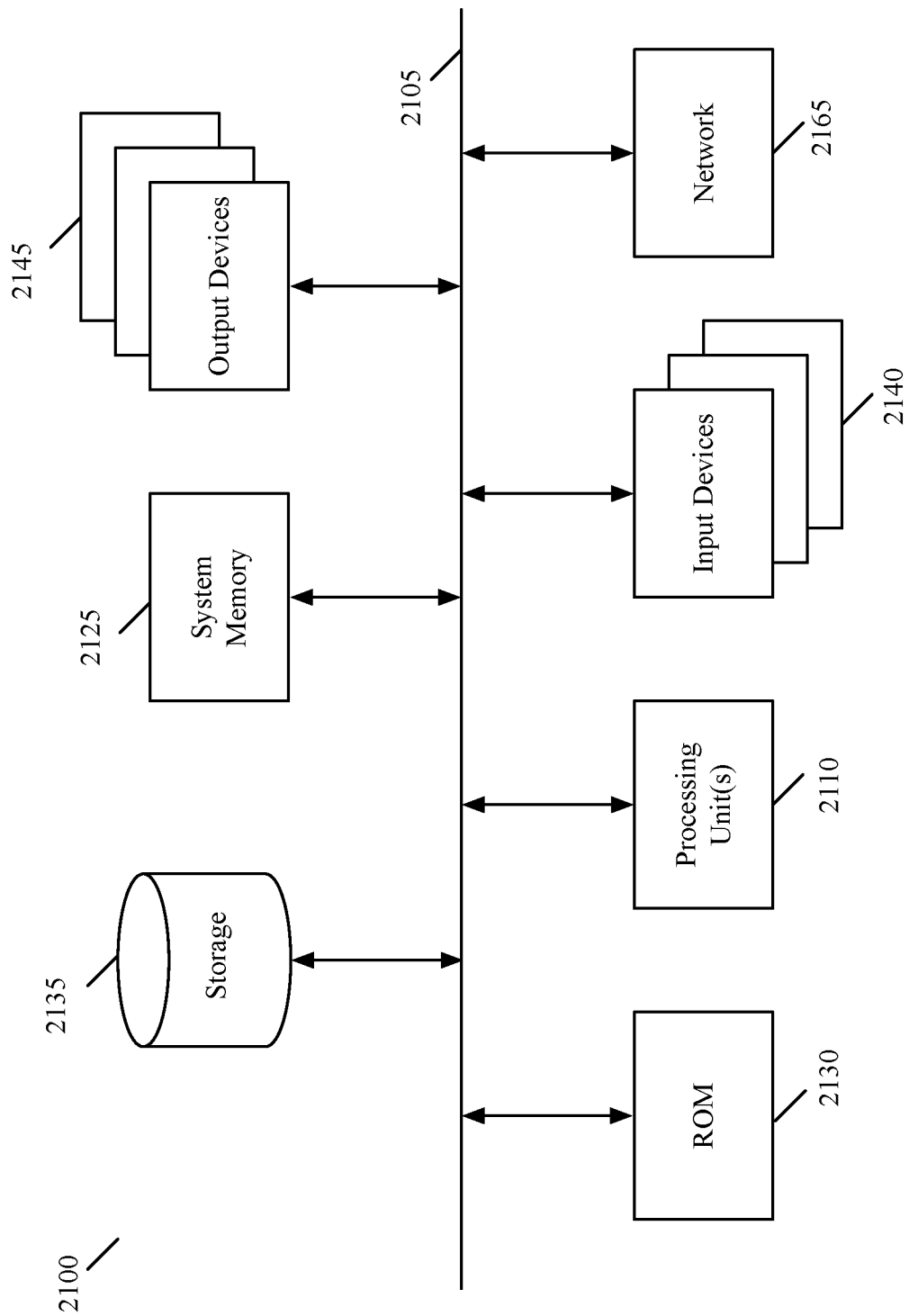

DYNAMICALLY ASSIGNING MACHINES TO TRAFFIC GROUPS BASED ON EDGE CAPACITY AND MACHINE PRIORITY

BACKGROUND

In a network, data message flows sent from traffic groups of machines (e.g., virtual machines (VMs), containers, Pods, etc.) are sent to external networks through a set of gateways of the network. When the bandwidth capacity of these gateways is exceeded, data message flows start getting dropped at the gateways. Currently, to avoid this issue, some embodiments deploy an additional traffic group and an additional gateway in order to alleviate the overloaded gateway(s). However, this approach has several advantages.

First, traffic group gateways are costly. Second, in some environments (e.g., VMware Cloud on Amazon Web Services (AWS)) limit the number of traffic groups that are allowed to be deployed in the network. This results in a higher frequency of data message loss for users. Third, users in some embodiments have to manually monitor the bandwidth consumption of their network's gateways, and have to manually reassign machines to different traffic groups. This is error prone and is, most often, a reactive action to data message loss rather than preventative action. Fourth, current embodiments do not allow users to dynamically assign machines to traffic groups based on available bandwidth to accommodate additional machines' flows. Hence, methods and systems are needed for dynamically assigning machines to traffic groups based on capacity of gateways and machine priority.

BRIEF SUMMARY

Some embodiments provide a novel method for associating machines of a first network with gateways that connect the machines to an external second network. The method assigns first and second sets of machines to first and second traffic groups that are associated with first and second gateways. Based on statistics regarding data message load on the first gateway, the method identifies a first machine to reassign from a first traffic group to the second traffic group. The method reassigns the first machine to the second traffic group to reduce data message load on the first gateway.

In some embodiments, the method is performed by a set of one or more managers and controllers of the first network. The machines are in some embodiments virtual machines (VMs) executing on several host computers in the first network. In some embodiments, the first network is a cloud datacenter and the external second network is an on-premises datacenter that includes several on-premises machines. In such embodiments, the cloud datacenter and the on-premises datacenter are respectively first and second software defined datacenters (SDDCs).

The first machine is in some embodiments a high priority machine. By identifying this high priority machine and reassigning it to the second traffic group, the manager and controller set avoids flows sent by the high priority machine being dropped by the overloaded first gateway. In some embodiments, before identifying the first machine, the manager and controller set receives, from a user, a specification of the first machine as a high priority machine. In some of these embodiments, the specification further specifies one or more other machines of the first network as high priority machines. The user of some embodiments specifies the priority level (e.g., low, high, etc.) of each machine in the first network for the manager and controller set to reassign higher priority machines to non-overloaded gateways over lower priority machines.

In some embodiments, the manager and controller set identifies the first machine and a second machine of the first traffic group as high priority machines. In such embodiments, the manager and controller set determines that the second traffic group has enough available bandwidth for the first machine but not the second machine such that only the first machine can be reassigned to the second traffic group without overloading the second gateway. In order to alleviate the load on the first gateway, the manager and controller set still reassigns the first machine to the second traffic group, even though the second machine is also specified as a high priority machine. The second machine continues to be assigned to the first traffic group.

Before identifying the first machine, and based on a first set of statistics regarding the data message load on the first gateway, the manager and controller set in some embodiments determines that a first predicted future load on the first gateway exceeds a particular threshold. In some of these embodiments, the manager and controller set, before reassigning the first machine and based on a second set of statistics regarding data message load on the second gateway, determines that the second traffic group has available bandwidth, such that a second predicted future load on the second gateway does not exceed the particular threshold even if the first machine uses the second gateway along with the second set of machines.

In some embodiments, the manager and controller set collects the first and second sets of statistics. In such embodiments, the collected statistics include statistics associated with bandwidth usage of one or more particular uplink interfaces of the first and second gateways used to connect to the external second network. Each of the first and second gateways in some embodiments includes a Tier-0 (T0) gateway and a Tier-1 (T1) gateway, and the one or more particular uplink interfaces are one or more particular uplink interfaces of the T0 gateways. These particular uplink interfaces are one or more of Internet interfaces, Intranet interfaces, and virtual private cloud (VPC) interfaces of the T0 gateways.

The manager and controller set in some embodiments determines that the first predicted future load on the first gateway by analyzing the first set of statistics to determine that the first predicted future load on the first gateway exceeds the particular threshold. In such embodiments, the manager and controller set uses the first set of statistics to perform predictive modeling computations to predict the first predicted future load on the first gateway. In some embodiments, similar analyzations are performed for each gateway in the first network for the manager and controller set to monitor each gateway's bandwidth usage.

In some embodiments, the manager and controller set determines that the second traffic group has available bandwidth by analyzing the second set of statistics to determine that the second set of machines uses less than a total bandwidth provisioned for the second gateway. In some of these embodiments, the manager and controller set determines that the second traffic group has available bandwidth by (1) identifying a first bandwidth utilization of the second set of machines, (2) identifying a second bandwidth utilization of the first machine, and (3) summing the first and second bandwidth utilizations to determine that the second predicted future load on the second gateway does not exceed the particular threshold even if the first machine use the second gateway along with the second set of machines. In some embodiments, each gateway is provisioned a particular amount of bandwidth by the user. In some of these embodiments, each gateway is provisioned a same amount of bandwidth. In other embodiments, at least two different gateways are assigned different amounts of bandwidth. By determining that the second traffic group has enough available bandwidth for the first machine such that it does not overload the second gateway, the manager and controller set determines that the second gateway can handle the load of the traffic of both the second set of machines and the first machine.

The manager and controller set in some embodiments collects the first and second sets of statistics by retrieving the first and second sets of statistics from a data store. Before retrieving the statistics, the manager and controller set in some embodiments (1) iteratively collects subsets of statistics for the first and second gateways and the first and second sets of machines at specified time intervals, and (2) stores the collected subsets of statistics in the data store. The first and second sets of statistics in some embodiments include the subsets of statistics. In some embodiments, the data store is a time-series database. Each subset of statistics in some embodiments specifies the amount bandwidth of a gateway being used at a particular time. For example, the percentage of bandwidth being used on a gateway is collected every minute in some embodiments, so each subset of statistics specifies the percentage of bandwidth use at the particular time the statistic was collected.

In some embodiments, the first machine is reassigned to the second traffic group by configuring a set of routers to forward data message flows from the first machine to the second gateway. The set of routers is in some embodiments the internal routing fabric of the first network, while the first and second gateways are defined at the boundary of the first network to connect to the external second network. In some embodiments, the routers are standalone routers. In other embodiments, the routers are implemented on one or more host computers in the first network. In some embodiments, the set of routers is configured by distributing forwarding rules or routing records to the set of routers, with each routing record specifying that data message flows associated with the first machine are to be sent through the second gateway.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

FIG. 21 conceptually illustrates an electronic system with which some embodiments of the invention are implemented.

DETAILED DESCRIPTION

Figure 1:
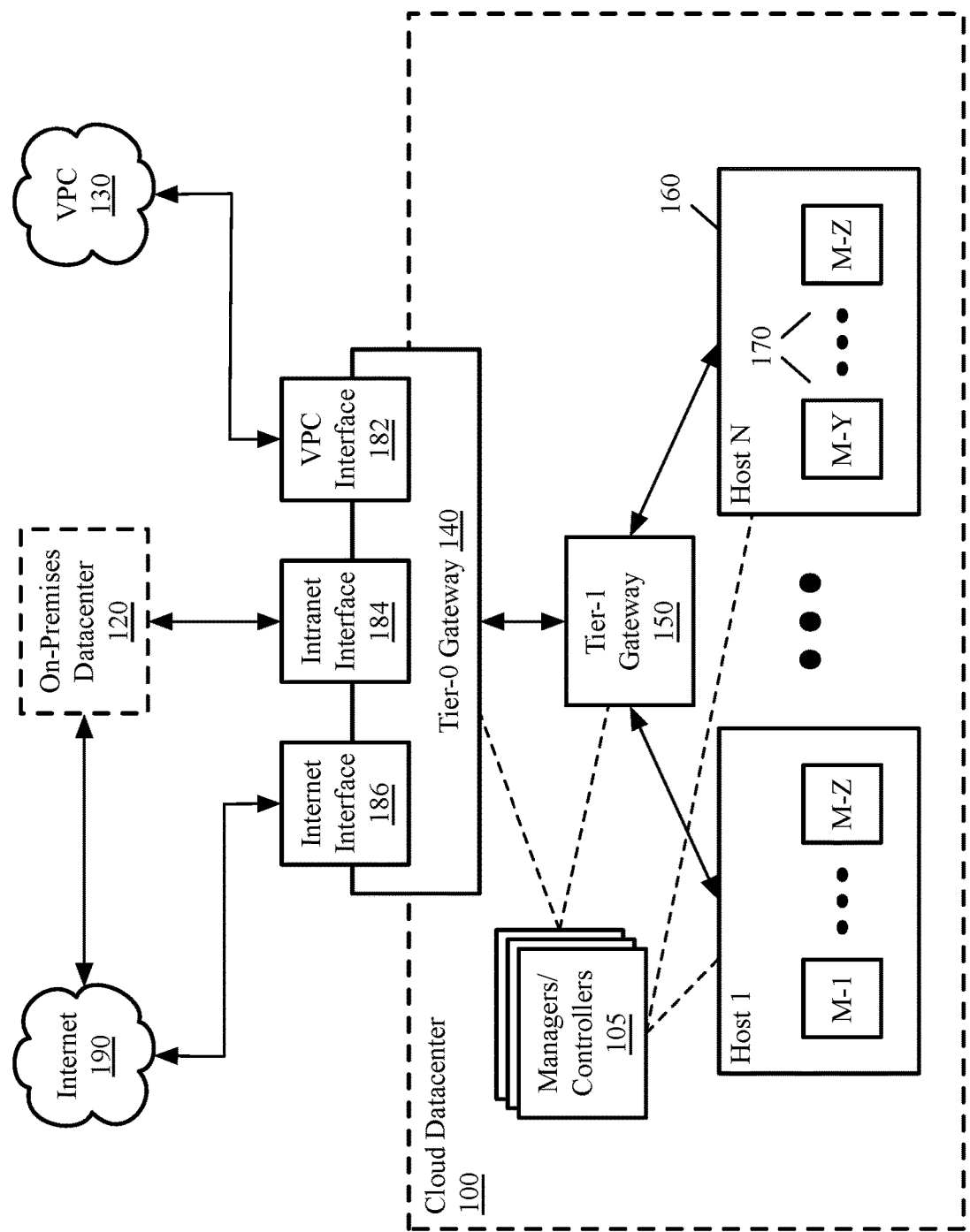
FIG. 1 illustrates an example cloud datacenter that communicates with an on-premises datacenter and a virtual private cloud through a Tier-0 gateway.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for associating machines of a first network with gateways that connect the machines to an external second network. The method assigns first and second sets of machines to first and second traffic groups that are associated with first and second gateways. Based on statistics regarding data message load on the first gateway, the method identifies a first machine to reassign from a first traffic group to the second traffic group. The method reassigns the first machine to the second traffic group to reduce data message load on the first gateway.

In some embodiments, the method is performed by a set of one or more managers and controllers of the first network. The machines are in some embodiments virtual machines (VMs) executing on several host computers in the first network. In some embodiments, the first network is a cloud datacenter and the external second network is an on-premises datacenter that includes several on-premises machines. In such embodiments, the cloud datacenter and the on-premises datacenter are respectively first and second software defined datacenters (SDDCs).

The first machine is in some embodiments a high priority machine. By identifying this high priority machine and reassigning it to the second traffic group, the manager and controller set avoids flows sent by the high priority machine being dropped by the overloaded first gateway. In some embodiments, before identifying the first machine, the manager and controller set receives, from a user, a specification of the first machine as a high priority machine. In some of these embodiments, the specification further specifies one or more other machines of the first network as high priority machines. The user of some embodiments specifies the priority level (e.g., low, high, etc.) of each machine in the first network for the manager and controller set to reassign higher priority machines to non-overloaded gateways over lower priority machines.

In some embodiments, the manager and controller set identifies the first machine and a second machine of the first traffic group as high priority machines. In such embodiments, the manager and controller set determines that the second traffic group has enough available bandwidth for the first machine but not the second machine such that only the first machine can be reassigned to the second traffic group without overloading the second gateway. In order to alleviate the load on the first gateway, the manager and controller set still reassigns the first machine to the second traffic group, even though the second machine is also specified as a high priority machine. The second machine continues to be assigned to the first traffic group.

In some embodiments, a gateway associated with a traffic group determined to have available bandwidth does not have enough bandwidth for all machines identified to be reassigned. In such embodiments, the manager and controller set determines one or more of the identified machines to reassign, and keeps the rest of the identified machines assigned to their current traffic group. By reassigning only the first machine, the manager and controller set still alleviates the load on the first gateway, even though not all identified machines were reassigned to the second traffic group.

Before identifying the first machine, and based on a first set of statistics regarding the data message load on the first gateway, the manager and controller set in some embodiments determines that a first predicted future load on the first gateway exceeds a particular threshold. In some of these embodiments, the manager and controller set, before reassigning the first machine and based on a second set of statistics regarding data message load on the second gateway, determines that the second traffic group has available bandwidth, such that a second predicted future load on the second gateway does not exceed the particular threshold even if the first machine uses the second gateway along with the second set of machines.

In some embodiments, the manager and controller set collects the first and second sets of statistics. In such embodiments, the collected statistics include statistics associated with bandwidth usage of one or more particular uplink interfaces of the first and second gateways used to connect to the external second network. Each of the first and second gateways in some embodiments includes a Tier-0 (T0) gateway and a Tier-1 (T1) gateway, and the one or more particular uplink interfaces are one or more particular uplink interfaces of the T0 gateways. These particular uplink interfaces are one or more of Internet interfaces, Intranet interfaces, and virtual private cloud (VPC) interfaces of the T0 gateways.

The manager and controller set in some embodiments determines that the first predicted future load on the first gateway by analyzing the first set of statistics to determine that the first predicted future load on the first gateway exceeds the particular threshold. In such embodiments, the manager and controller set uses the first set of statistics to perform predictive modeling computations to predict the first predicted future load on the first gateway. In some embodiments, similar analyzations are performed for each gateway in the first network for the manager and controller set to monitor each gateway's bandwidth usage.

In some embodiments, the manager and controller set determines that the second traffic group has available bandwidth by analyzing the second set of statistics to determine that the second set of machines uses less than a total bandwidth provisioned for the second gateway. In some of these embodiments, the manager and controller set determines that the second traffic group has available bandwidth by (1) identifying a first bandwidth utilization of the second set of machines, (2) identifying a second bandwidth utilization of the first machine, and (3) summing the first and second bandwidth utilizations to determine that the second predicted future load on the second gateway does not exceed the particular threshold even if the first machine use the second gateway along with the second set of machines. In some embodiments, each gateway is provisioned a particular amount of bandwidth by the user. In some of these embodiments, each gateway is provisioned a same amount of bandwidth. In other embodiments, at least two different gateways are assigned different amounts of bandwidth. By determining that the second traffic group has enough available bandwidth for the first machine such that it does not overload the second gateway, the manager and controller set determines that the second gateway can handle the load of the traffic of both the second set of machines and the first machine.

The manager and controller set in some embodiments collects the first and second sets of statistics by retrieving the first and second sets of statistics from a data store. Before retrieving the statistics, the manager and controller set in some embodiments (1) iteratively collects subsets of statistics for the first and second gateways and the first and second sets of machines at specified time intervals, and (2) stores the collected subsets of statistics in the data store. The first and second sets of statistics in some embodiments include the subsets of statistics. In some embodiments, the data store is a time-series database. Each subset of statistics in some embodiments specifies the amount bandwidth of a gateway being used at a particular time. For example, the percentage of bandwidth being used on a gateway is collected every minute in some embodiments, so each subset of statistics specifies the percentage of bandwidth use at the particular time the statistic was collected.

In some embodiments, the first machine is reassigned to the second traffic group by configuring a set of routers to forward data message flows from the first machine to the second gateway. The set of routers is in some embodiments the internal routing fabric of the first network, while the first and second gateways are defined at the boundary of the first network to connect to the external second network. In some embodiments, the routers are standalone routers. In other embodiments, the routers are implemented on one or more host computers in the first network. In some embodiments, the set of routers is configured by distributing forwarding rules or routing records to the set of routers, with each routing record specifying that data message flows associated with the first machine are to be sent through the second gateway.

As used herein, the term gateway will be used to describe a forwarding element at the edge of a network. A gateway can also be referred to as an edge, edge gateway, edge forwarding element, or edge appliance. In some embodiments, a segment includes one or more network addresses of a network.

FIG. 1 illustrates an example cloud datacenter 100 that communicates with an on-premises datacenter 120 and a virtual private cloud (VPC) 130. The cloud datacenter 100 is in some embodiments a software defined datacenter (SDDC) managed and controlled by a set of managers and controllers 105, and communicates with the on-premises datacenter 120 and the VPC 130 using a Tier-0 (T0) gateway 140. The cloud datacenter 100 also includes a Tier-1 (T1) gateway 150 and host computers 160 executing machines 170. The cloud datacenter 100 may include any number of host computers 160, and each host computer can include any number of machines 170. These may be virtual machines (VMs), containers, pods, etc. that are sources and destinations of traffic for the cloud datacenter 100. The manager and controller set 105 manages and controls all gateways and hosts of the cloud datacenter 100.

The T0 gateway 140 is used to exchange north-south traffic (i.e., traffic with external networks, such as the on-premises datacenter 120 and the VPC 130). The T1 gateway 150 is used in the cloud datacenter 100 to exchange east-west traffic (i.e., traffic within the datacenter 100). In a default configuration, the cloud datacenter 100 includes one T0 gateway 140 and one T1 gateway 150. T0 and T1 gateways may be added to the cloud datacenter 100 as necessary. In some embodiments, the gateways 140 and 150 operate on an edge appliance implemented as a pair of VMs of the cloud datacenter 100. To avoid sending east-west traffic through this edge appliance, some embodiments deploy a component of the T1 gateway 150 on each host computer 160 that each handle routing for destinations within the datacenter 100.

To connect to external networks, the T0 gateway 140 includes three interfaces (also referred to as uplinks or uplink interfaces). A VPC interface 182 (also referred to as a cross-VPC interface) connects to the VPC 130. An Intranet interface 184 connects to the on-premises datacenter 120. An Internet interface 186 also connects to the on-premises datacenter 120, but does so through the public Internet 190.

When creating the cloud datacenter 100, some embodiments pre-allocate elastic network interfaces (ENIs) in the VPC 130. Each ENI is assigned an Internet Protocol (IP) address from a subnet specified at creation of the cloud datacenter 100, and each host 160 is attached to one of the ENIs. In some embodiments, an additional IP address is assigned to an ENI where the edge appliance (running the T0 and T1 gateways 140 and 150). This connection to the VPC 130 supports network traffic between the machines 170 and native public cloud service endpoints (e.g., native Amazon Web Services (AWS) service endpoints offered by AWS). A route table of the VPC 130 is aware of the VPC's primary subnet, as well as all subnets of the cloud datacenter 100.

To connect the cloud datacenter 100 to the on-premises datacenter 120, different embodiments create a virtual private network (VPN) that uses the Internet 190, a VPN that directly connects to the on-premises datacenter 120, or a direct connection to the on-premises datacenter 120. These VPNs may be Internet Protocol Security (IPsec) VPNs, and can be policy-based or route-based. Directly connecting to the on-premises datacenter 120, which uses the Intranet interface 184, creates a high-speed, low-latency connection with the on-premises datacenter 120, rather than using the public Internet 190.

In some embodiments, traffic exchanged between an SDDC and an external network is steered through a gateway of the SDDC. The bandwidth for which the SDDC exchanges traffic with the external network may be determined by the minimum of the gateway's uplink bandwidth and the host adapter network bandwidth. In some embodiments, there are applications executing in the SDDC associated with data message flows that require a large bandwidth, and that consume a large amount of edge network capacity. These applications may execute on one or more machines (e.g., VMs, containers, pods, etc.) in the SDDC. The VMs of the SDDC are in some embodiments referred to as workloads. These workloads exchange data messages with the external network through the default edge gateway of the SDDC.

In some embodiments, the Intranet interface of a gateway is used by direct connect and transit gateway interfaces. For a direct connect or transit connect, all workloads of the SDDC use the Intranet interface of the edge gateway. This puts a significant amount of load on the Intranet interface, which then increases latency for the workloads' traffic. Because of this, there is a need to identify and correctly predict the workloads causing performance overhead on the edge gateway's Intranet interface and take a corrective measure to reduce the load on the edge gateway.

In some embodiments, because only one T0 gateway is initially deployed in a cloud datacenter, the T0 gateway can be overloaded with traffic exchanged between the machines in the cloud datacenter and the on-premises datacenter, more specifically, on the Intranet uplink interface of the T0 gateway. In some embodiments, after predicting that the future load on the T0 gateway will be overloaded, an additional T0 and T1 gateway pair is deployed in the cloud datacenter. In such embodiments, after deploying an additional gateway pair, the machines in the cloud datacenter use both T0 gateways to connect to the on-premises datacenter.

Figure 2:
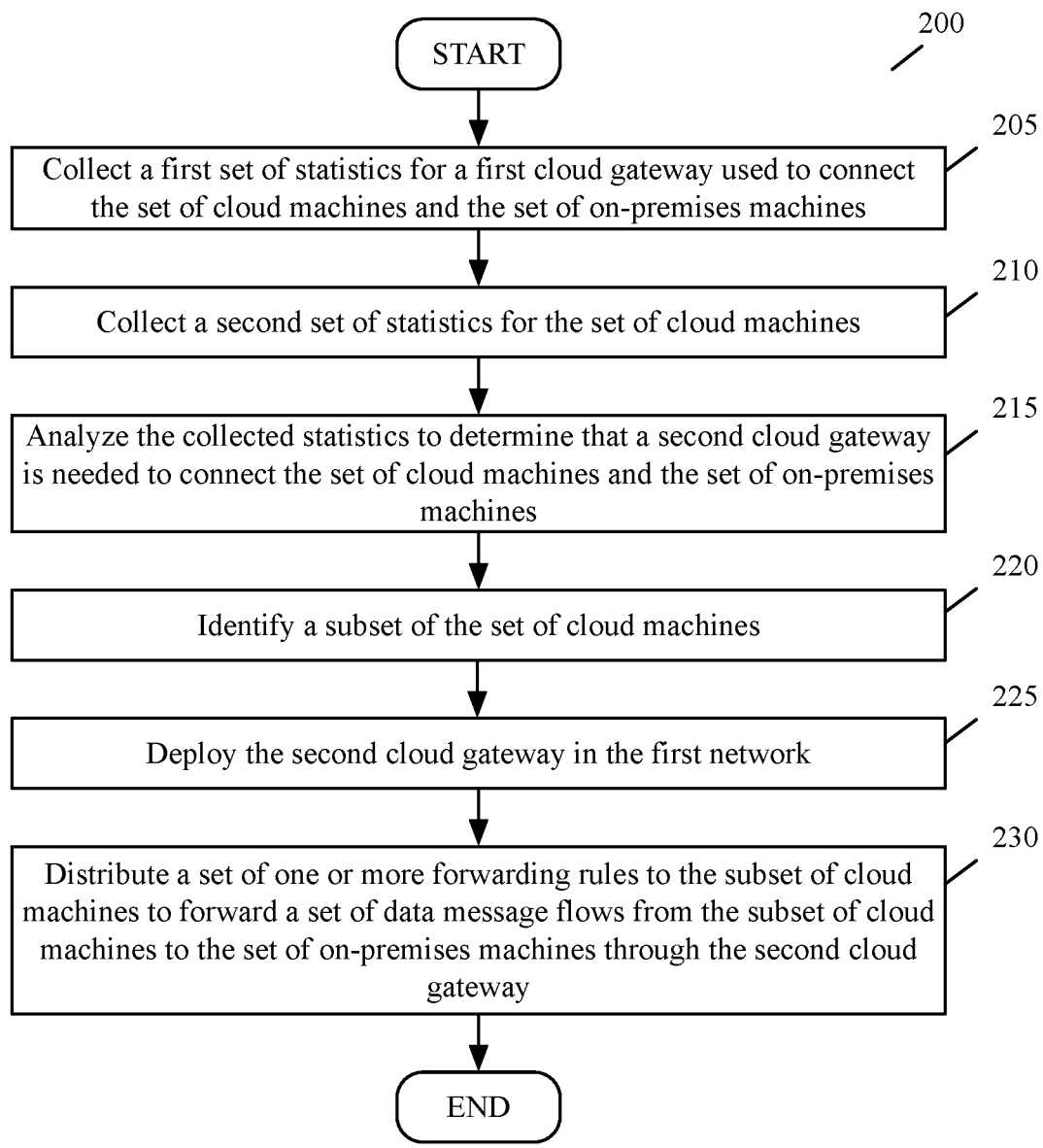
FIG. 2 conceptually illustrates a process of some embodiments for deploying cloud gateways between a set of cloud machines in a first network and a set of on-premises machines in an external network.

FIG. 2 conceptually illustrates a process 200 of some embodiments for deploying cloud gateways between a set of cloud machines in a first network and a set of on-premises machines in an external network. This process 200 may be performed by a set of one or more managers and controllers of the first network. The first network may be an SDDC or a cloud datacenter, such as the cloud datacenter 100. The external network may be an on-premises datacenter, such as the on-premises datacenter 120.

The process 200 begins by collecting (at 205) a first set of statistics for a first cloud gateway used to connect the set of cloud machines and the set of on-premises machines. The first cloud gateway is the default cloud gateway of the first network, meaning that all other cloud gateways deployed in the first network to connect to the on-premises machines are additional cloud gateways. The first set of statistics in some embodiments specifies statistics specifying bandwidth use of the first cloud gateway by the set of cloud machines at different times. These statistics may specify bandwidth use of a particular uplink interface (e.g., an Intranet interface) of the first cloud gateway, as this particular uplink interface connects the first network to the external network. In some embodiments, each statistic in the first set specifies the amount of bandwidth of the first cloud gateway being used by the cloud machines at a particular time, such that the set of statistics represents time-series bandwidth usage statistics of the first cloud gateway.

In some embodiments, the first set of statistics is retrieved by the manager and controller set from a data store. Before retrieving the set of statistics from the data store, some embodiments iteratively collect subsets of statistics for the first cloud gateway at specified time intervals, and store the collected subsets of statistics in the data store. Each subset of statistics may specify the amount bandwidth of the first cloud gateway being used at a particular time. For example, the percentage of bandwidth being used on the first cloud gateway may be collected every minute, so each subset of statistics specifies the percentage of bandwidth use at the particular time the statistic was collected. The first set of statistics includes in some embodiments different subsets of statistics. The data store of some embodiments is a time-series database.

The process 200 also collects (at 210) a second set of statistics for the set of cloud machines. This second set of statistics in some embodiments specifies the throughput of each cloud machine, which indicates the amount of bandwidth of the first cloud gateway each cloud machine uses. These statistics may be initially collected by a metrics collector operating on each host computer hosting at least one cloud machine in the first network. For instance, on a particular host computer that executes a subset of cloud machines, a metrics collector measures the throughput for each of the subset of machines. The host metrics collectors in some embodiments store these statistics in the same data store that stores the first set of statistics for the first cloud gateway.

Then, the process analyzes (at 215) the collected statistics to determine that a second cloud gateway is needed to connect the set of cloud machines and the set of on-premises machines. In some embodiments, this determination is performed using only the first set of statistics. In other embodiments, it is performed using both the first and second sets of statistics. By analyzing bandwidth usage statistics, the manager and controller set of some embodiments determines that a predicted future bandwidth use of the first cloud gateway by the set of cloud machines exceeds a particular threshold of bandwidth use. Using historical bandwidth usage statistics, the manager and controller set of some embodiments performs predictive modeling computations in order to predict the future amount of bandwidth used by the cloud machines on the first cloud gateway. For example, if the controller set predicts that the first cloud gateway will reach 80% of its bandwidth use, and 80% is the specified threshold, the manager and controller set determines that the second cloud gateway is needed.

Next, the process identifies (at 220) a subset of the set of cloud machines. The second set of statistics may be analyzed to determine that the subset of cloud machines consumes more bandwidth of the first cloud gateway than other cloud machines in the set of cloud machines. For instance, the controller set can use the second set of statistics to determine which cloud machines have higher throughput, and therefore, use more bandwidth of the first cloud gateway. By identifying the higher bandwidth usage cloud machines, the manager and controller set can group them in order to reassign their traffic to a different cloud gateway.

Then, the process 200 deploys (at 225) the second cloud gateway in the first network. The manager and controller set deploys the additional second cloud gateway in the first network so the identified subset of cloud machines can use it to exchange data messages with the set of on-premises machines. Alternatively, in some embodiments, the second cloud gateway is already deployed in the first network. In these embodiments, the manager and controller set identifies the second cloud gateway as connecting to the on-premises machines, but not being used by any cloud machines, so the second cloud gateway is available to be assigned to the subset of cloud machines.

Lastly, the process 200 distributes (at 230) a set of one or more forwarding rules to the subset of cloud machines to forward a set of data message flows from the subset of cloud machines to the set of on-premises machines through the second cloud gateway. By directing traffic of the subset of cloud machines through the additional second cloud gateway, the manager and controller set alleviates the load on the default first cloud gateway. In some embodiments, cloud machines in the first network not in the identified subset of cloud machines continue to forward data message flows to the set of on-premises machines through the first cloud gateway. In such embodiments, the manager and controller set uses the second cloud gateway to exchange some of the cloud machines' traffic with the on-premises machines, while other cloud machines continue to use the first cloud gateway. After the subset of cloud machines are given the forwarding rules to use the second cloud gateway, the process 200 ends.

Figure 3:
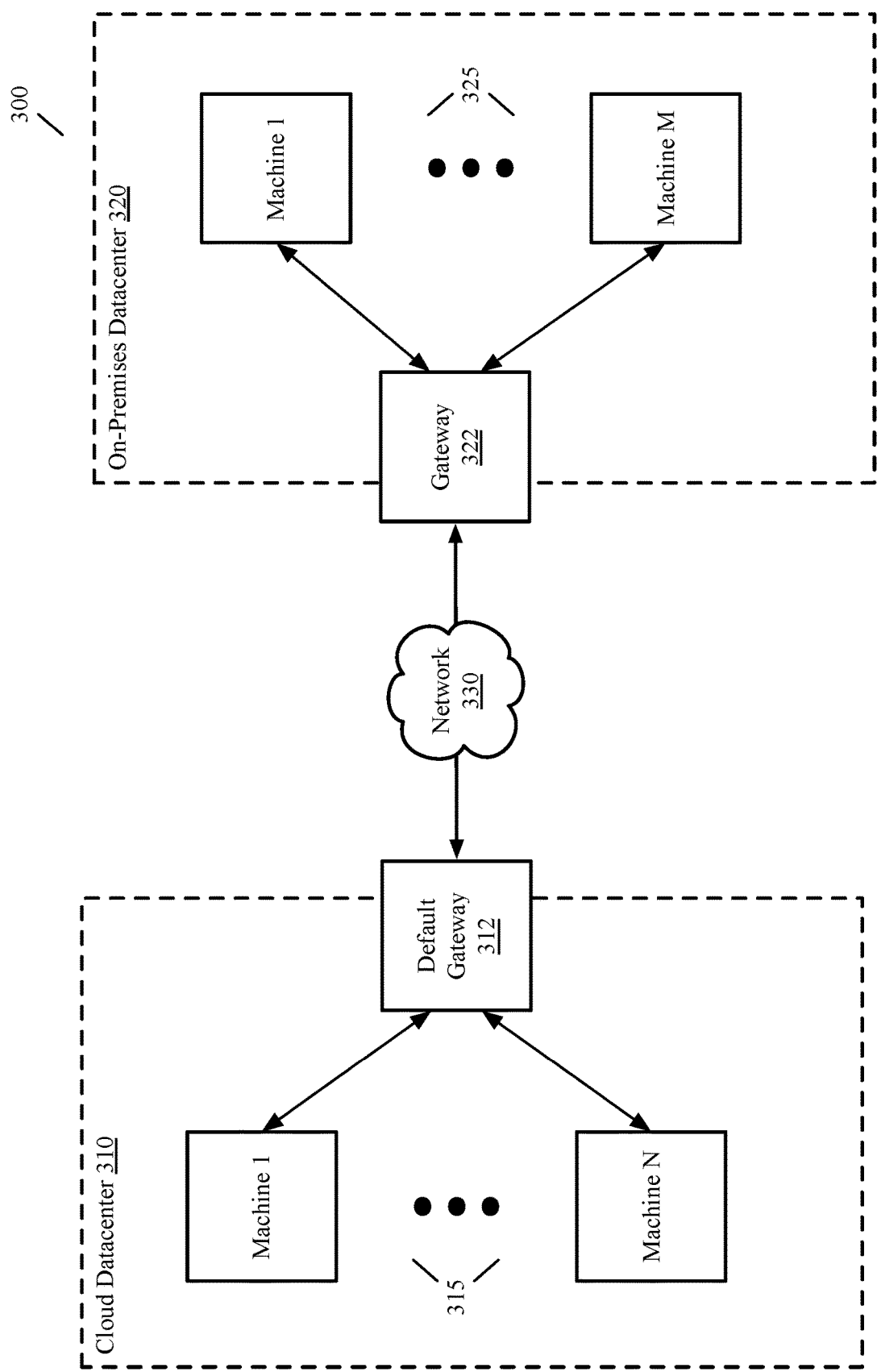
FIG. 3 illustrates an example system for a cloud datacenter that uses one default gateway to communicate with an on-premises datacenter through a network.

FIG. 3 illustrates an example system 300 for a cloud datacenter 310 that uses one default gateway 312 to communicate with an on-premises datacenter 320 through a network 330. In this example, all machines 315 of the cloud datacenter 310 communicate with the machines 325 in the on-premises datacenter 320 using the default gateway 312, namely the default gateway 312 forwards all traffic from the machines 315 through the network 330 to the gateway 322 of the on-premises datacenter 320. The cloud datacenter 310 may include any number of machines 315, and the machines may be executing on any number of host computers. Because the default gateway 312 is the only gateway currently deployed in the cloud datacenter 310 to communicate with the on-premises datacenter 320, the cloud datacenter 310 can deploy one or more additional gateways to handle the traffic load. Although the default gateway 312 is illustrated as a single embodiment, the default gateway 312 in some embodiments represents a set of a T0 gateway and a T1 gateway.

Figure 4:
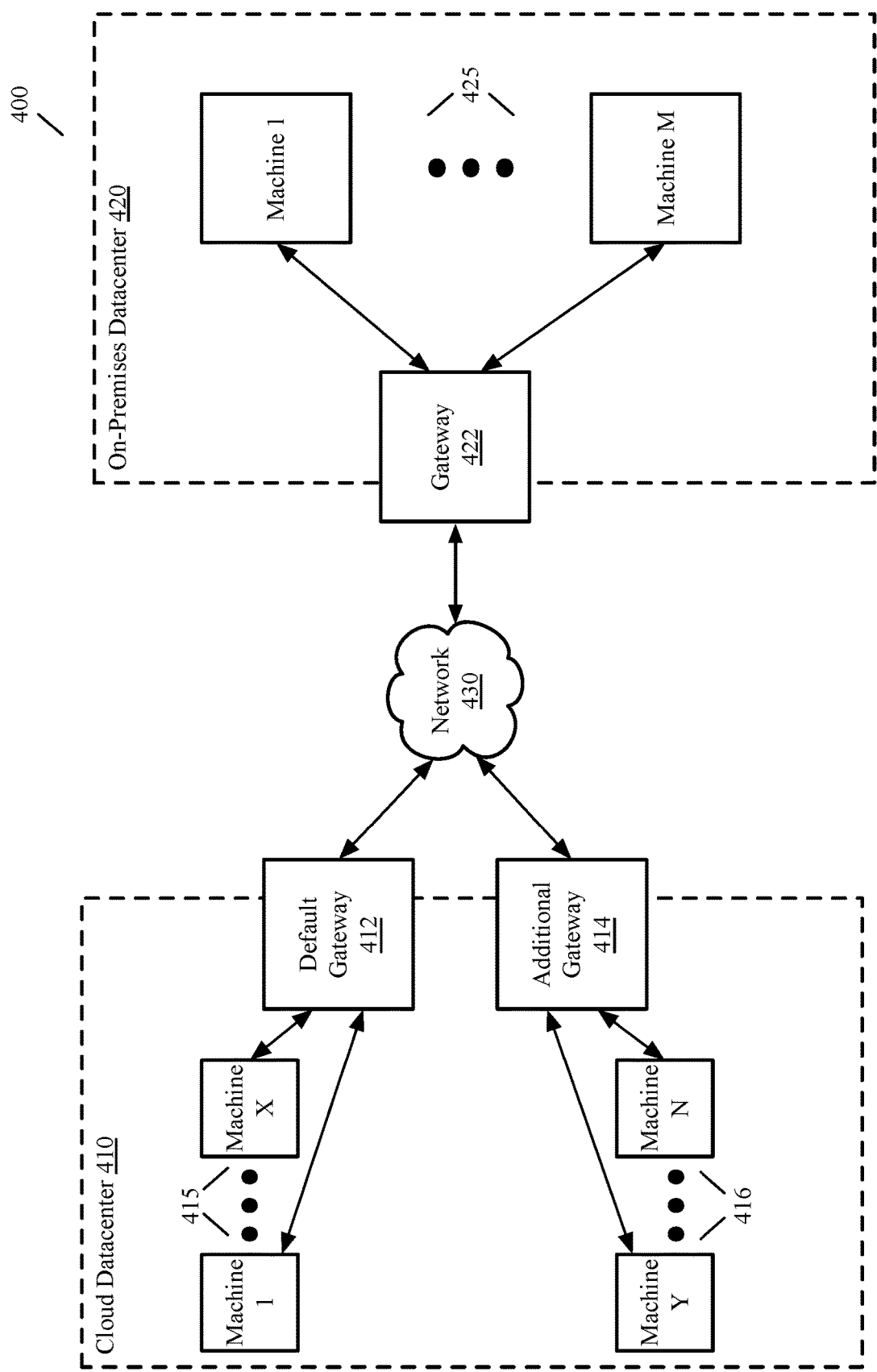
FIG. 4 illustrates an example system for a cloud datacenter that uses a default gateway and an additional gateway to communicate with an on-premises datacenter through a network.

FIG. 4 illustrates an example system 400 for a cloud datacenter 410 that uses a default gateway 412 (e.g., a default T0 and T1 gateway pair) and an additional gateway 414 (e.g., an additional T0 and T1 gateway pair) to communicate with an on-premises datacenter 420 through a network 430. In this example, a first set of machines 415 of the cloud datacenter 410 communicate with the on-premises machines 425 using the default gateway 412, while a second set of machines 416 communicate with the on-premises machines 425 using the additional gateway 414.

In some embodiments, each set of machines 415 and 416 may include machines executing on one or more host computers in the cloud datacenter 410. For example, the first set of machines 415 can include machines executing on a first set of host computers, and the second set of machines 416 may include machines including a second set of host computers. The first and second host computers may include at least one same host computer, meaning that two machines on the same host computer can be assigned to different gateways 412 and 414. The additional gateway 414 is in some embodiments deployed based on a prediction that the bandwidth use of the default gateway 412 by all machines that use it will exceed a specified threshold. Both gateways 412 and 414 forward traffic through the network 430 to the gateway 422 of the on-premises datacenter 420.

Figure 5:
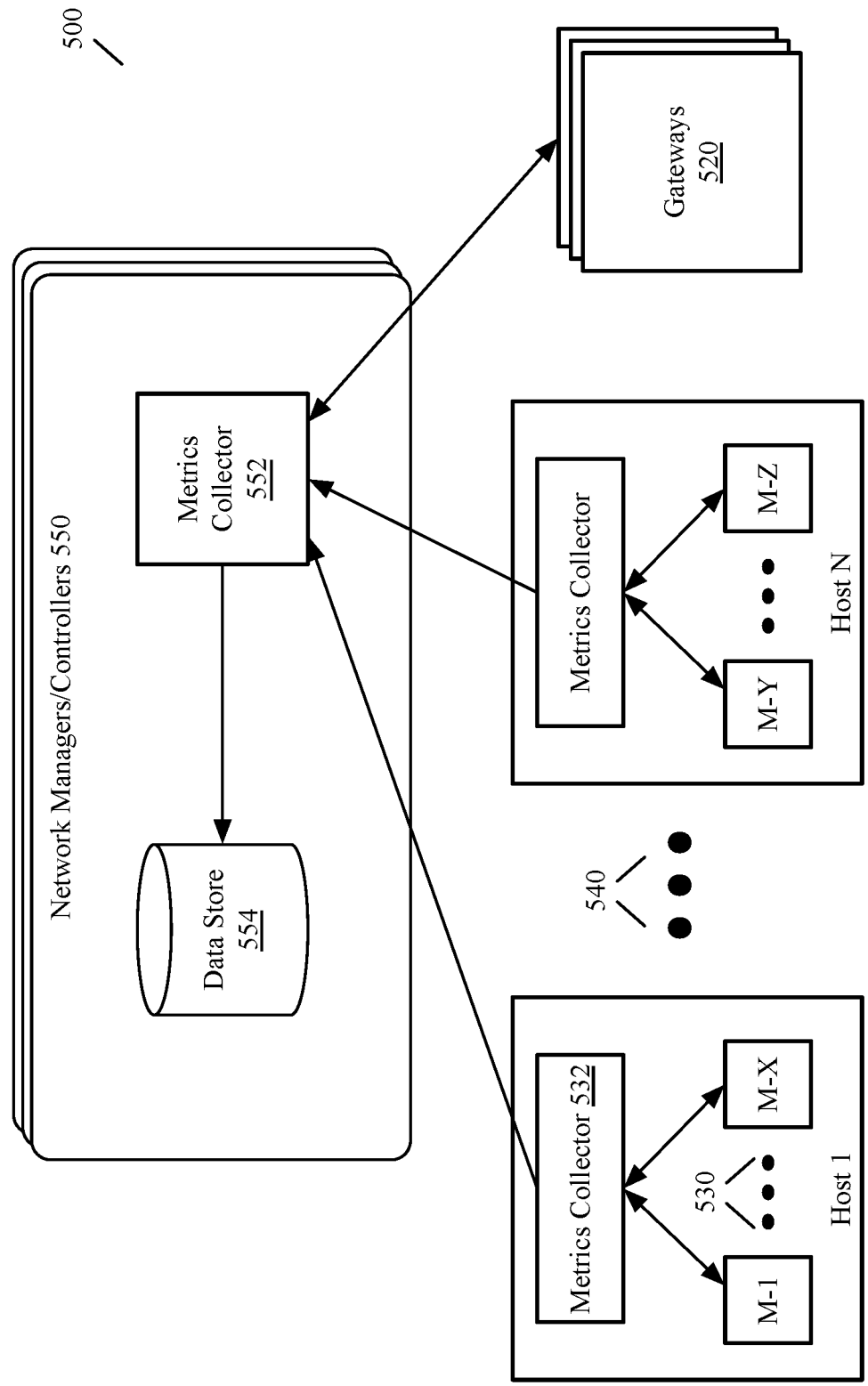
FIG. 5 illustrates a system of some embodiments for collecting metrics for gateways and machines operating on host computers.

As discussed previously, a set of one or more managers and controllers may dynamically deploy gateways in a datacenter based on bandwidth usage predictions. These bandwidth usage predictions in some embodiments are computed using past bandwidth usage metrics collected for gateways and the machines that use the gateways. FIG. 5 illustrates a system 500 of some embodiments for collecting metrics for gateways 520 and machines 530 operating on host computers 540. There may be any number of gateways 520, any number of machines 530 on each host computer 540, and any number of host computers 540.

A manager and controller set 550 includes a metrics collector 552 which is responsible for collecting bandwidth metrics and statistics for one or more gateways 520 in the system 500. Specifically, the metrics collector 552 monitors one or more of the gateways' uplink interfaces. The metrics collector 552 may monitor the Intranet, Internet, and VPC uplink interfaces, or may alternatively only monitor the Intranet uplink interfaces. The metrics collector 552 persists the metric data to a local data store 554 (e.g., a database) to be analyzed. The data store 554 in some embodiments is a time-series database.

In some embodiments, the metrics collector 552 collects metrics at various intervals, such as every 30 seconds, every minute, every five minutes, and every 30 minutes. The metrics collector 552 collects the bandwidth metrics of the gateway 520 uplink interfaces and, in some embodiments, calculates throughput values. The metrics collector 552 may persist the calculated throughput values into the data store 554. In some embodiments, the metrics collector 552 retrieves bandwidth statistics from each gateway 520 using an Application Programming Interface (API) call. The output of that API can include various metrics, such as a timestamp, the total number of bytes, the total number of packets, the total number of dropped packets, the total number of blocked packets, etc. In some embodiments, such metrics are collected for both received (Rx) and transmitted (Tx) data messages.

Using the transmitted metrics found at a particular timestamp, the throughput can be calculated by the metrics collector 552. For example, if the total number of bytes transmitted at time t1 is 271,440, and the total number of bytes transmitted at time t2 is 371,440, the difference can be computed, which is 100,000. Using this difference, the throughput can be calculated using the following equation:

$$\text{Throughput} = ((\textit{diffTotalBytes}) * 8)/(1024 * 1024 * \textit{diff})$$

where "diffTotalBytes" is the difference between the total bytes transmitted at time t2 and the total bytes transmitted at time t1, and "diff" is the difference in time between times t2 and t1. Any suitable method for calculating throughput may be used.

To collect statistics associated with machines 530 in the system 500, a metrics collector 532 operates on each host 540 that executes one or more machines 530. These host metrics collectors 532 collect metrics for each machine 530 executing on its host 540, and, in some embodiments, calculate the throughput for each machine 530 on its host 540. These metrics collectors 532 may collect metrics similarly to the metrics collector 552 described above by collecting metrics at various intervals, such as every 30 seconds, every minute, every five minutes, and every 30 minutes. Each metrics collector 532 collects throughput metrics for each machine 530 running on their host 540 at specified intervals. After collecting these metrics, the metrics collectors 532 provides the metrics to the metrics collector 552, which persists them into the data store 554. In other embodiments, the metrics collectors 532 persist the metrics directly into the data store 554.

Figure 6:
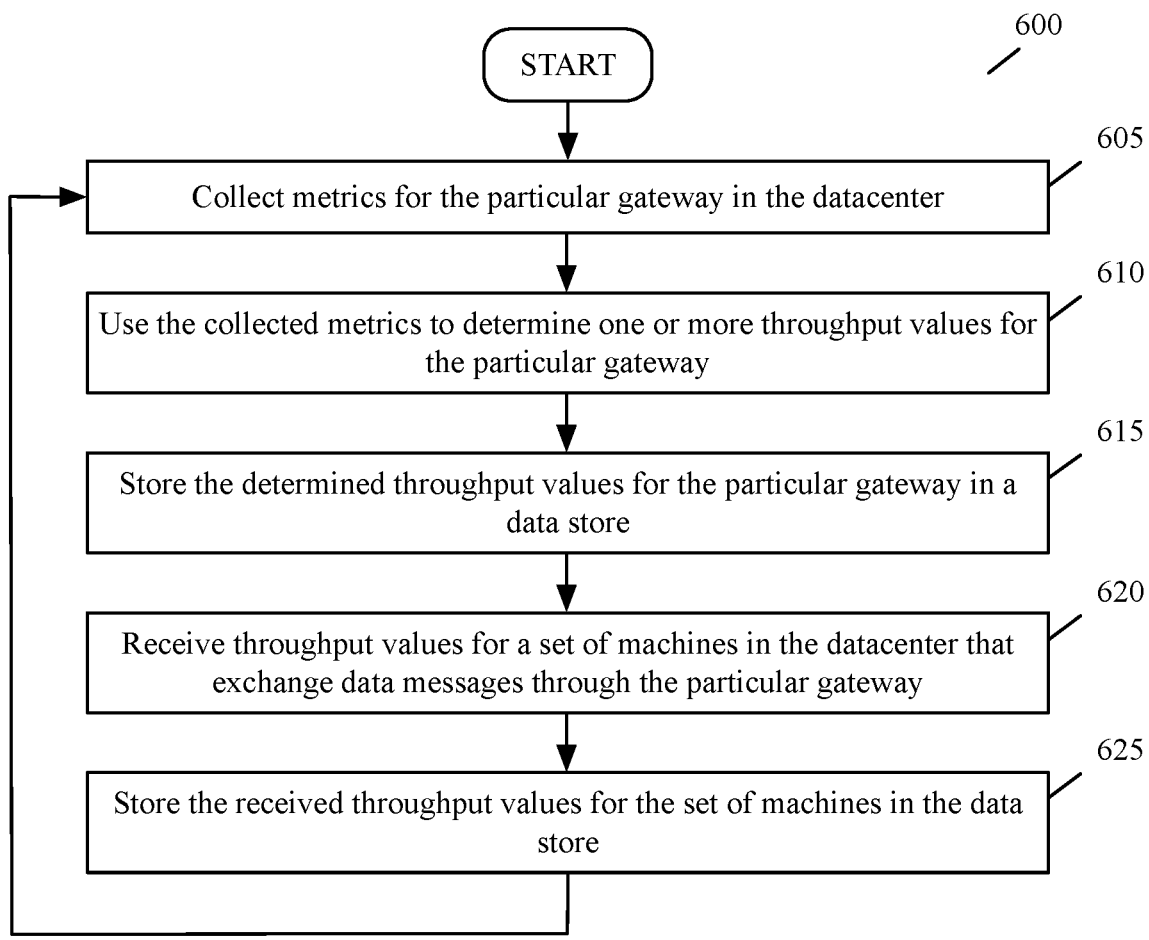
FIG. 6 conceptually illustrates a process of some embodiments for determining bandwidth statistics for a particular gateway of a datacenter and one or more machines of the datacenter.

FIG. 6 conceptually illustrates a process 600 of some embodiments for determining bandwidth statistics for a particular gateway of a datacenter and one or more machines of the datacenter. The process 600 may be performed by a metrics collector operating on a manager or controller of the SDDC, such as the metrics collector 552 of FIG. 5. The process 600 may be performed by one metrics collector for multiple gateways of a datacenter and for any number of machines. In some embodiments, the machines are VMs operating on host computers in the datacenter.

The process 600 begins by collecting (at 605) metrics for the particular gateway in the datacenter. In some embodiments, the metrics collector monitors one or more of the particular gateway's uplinks to collect the amount of data messages or bytes exchanged along one or more uplinks. The metrics collector may monitor the particular gateway's Intranet uplink, Internet uplink, VPC uplink, or a combination of all three uplinks. In some embodiments, the metrics collector collects metrics at various intervals. For example, the metrics collector may collect metrics for the particular gateway every 30 seconds, every minute, every five minutes, and every 30 minutes.

Next, the process 600 uses (at 610) the collected statistics to determine one or more throughput values for the particular gateway. As discussed previously, using metrics found at a particular timestamp, the throughput can be calculated by the metrics collector. For instance, if the total number of bytes transmitted at time t1 is 271,440, and the total number of bytes transmitted at time t2 is 371,440, the difference can be computed, which is 100,000. Using this difference, the throughput can be calculated using the equation described above.

Then, the process 600 stores (at 615) the determined throughput values for the particular gateway in a data store. This data store may be a database, such as a time-series database. The data store may reside along with the metrics collector on the manager or controller. In some embodiments, the collected metrics are also stored in the data store along with the determined throughput values. The stored throughput values may be stored along with a time interval or a timestamp for which the value is associated.

The process 600 also receives (at 620) throughput values for a set of machines in the datacenter that exchange data messages through the particular gateway. In some embodiments, a set of metrics collectors operates on the host computers in the datacenter, and each collects metrics and determines throughput values for each machine executing on its host. Each of these metrics collectors may, for each machine on its host, monitor the amount of data messages or bytes the machine exchanges with the particular gateway (more specifically, along the Intranet uplink of the particular gateway), and use those metrics to calculate a throughput for the machine at various time intervals. Then, the set of metrics collector may provide these throughput values to the metrics collector that monitors the particular gateway.

Then, the process 600 stores (at 625) the received throughput values for the set of machines in the data store. The received throughput values are stored in the same data store as the throughput values for the particular gateway. The process 600 may be performed iteratively (e.g., every minute, every five minutes, etc.) in order to continuously collect bandwidth usage statistics (i.e., throughput values) for the particular gateway and the set of machines. By storing historical bandwidth usage statistics for the particular gateway and the set of machines, a predicted bandwidth usage of the particular gateway can be determined, which allows for preventative operations to be made in order to obviate overloading the particular gateway.

Figure 7:
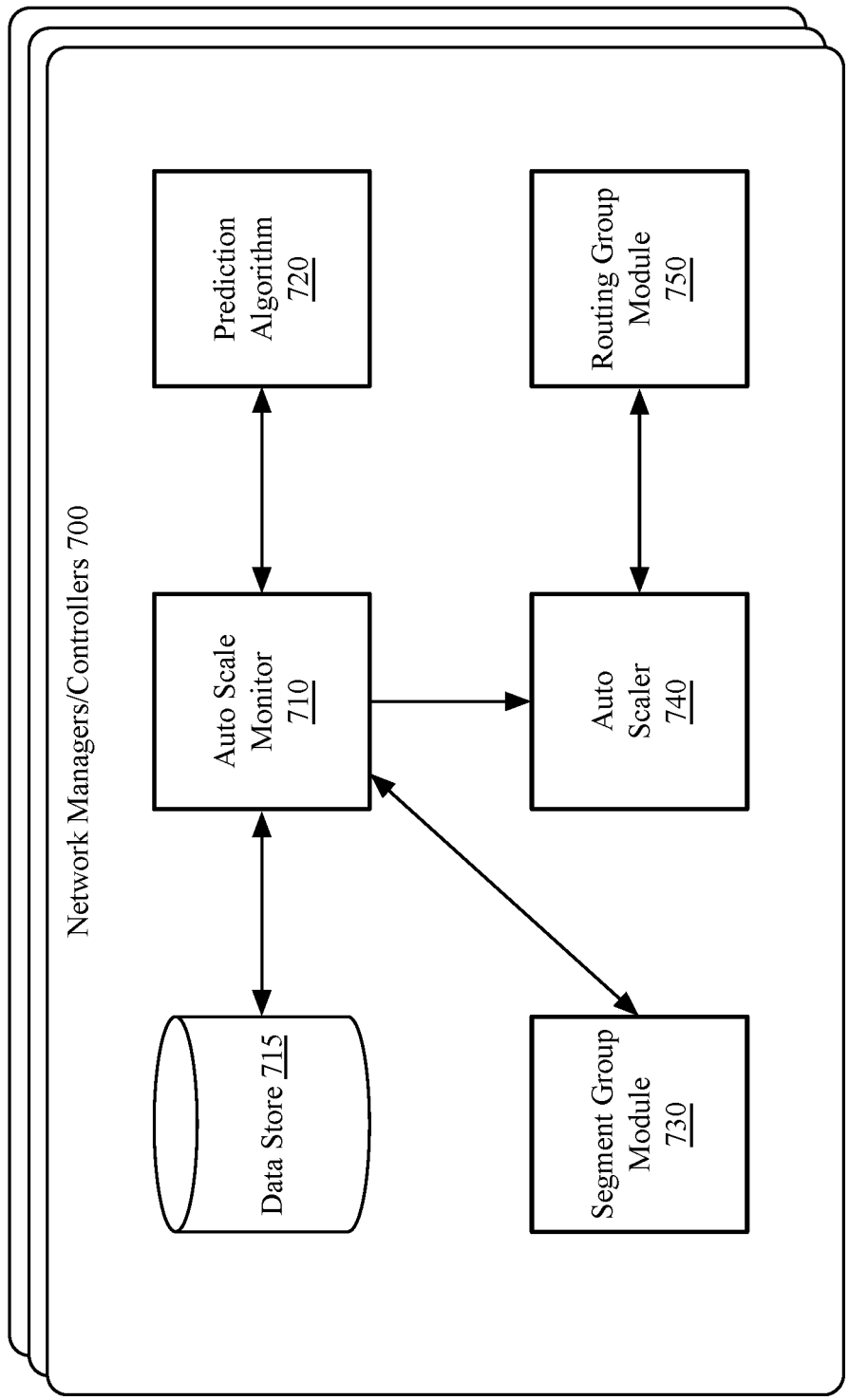
FIG. 7 illustrates a manager and controller set of a network that dynamically adds and removes gateways to the network based on monitored bandwidth usage of the gateways and the machines that exchange data messages with one or more external networks through the gateways.

FIG. 7 illustrates a manager and controller set 700 of a network that dynamically adds and removes gateways to the network based on monitored bandwidth usage of the gateways and the machines that exchange data messages with one or more external networks through the gateways. In some embodiments, the network is a datacenter, such as an SDDC. The manager and controller set 700 is in some embodiments a cluster of servers and can include any number of managers and controllers. Each component of the manager and controller set 700 described below may operate on the same manager or controller, or may operate in a distributed fashion across the managers and controllers.

The manager and controller set 700 of some embodiments includes an auto scale monitor 710. The auto scale monitor 710 is an application, program, and/or module that is responsible for monitoring bandwidth usage of one or more gateways using bandwidth usage statistics stored in the data store 715. The auto scale monitor 710 of some embodiments monitors each gateway's Internet, Intranet, and VPC bandwidth usage statistics. The auto scale monitor 710 may also predict at which time each gateway's bandwidth usage will exceed a specified threshold. In embodiments where the network already has multiple deployed gateways, the auto scale monitor 710 can monitor all of the gateways, determine when to add more gateways, and determine when to remove gateways in the network.

In some embodiments, the auto scale monitor 710 determines when to scale out (add) or scale in (terminate) gateways by using a machine learning algorithm 720. This algorithm 720 may be an Autoregressive Integrated Moving Average (ARIMA) algorithm, which is an open source algorithm that uses time-series data to predict future points in a series.

A time-series prediction algorithm, such as the algorithm 720, that predicts bandwidth usage of a gateway uplink interface may be trained and tested by first calculating the throughput for each gateway interface in megabits per second (Mbps) for each minute of the last 30 minutes. Receiving (Rx) and transmitting (Tx) data may be available at each gateway interface. Using this data, an average throughput for each minute can be calculated to create a set of throughput values to test the algorithm. Alternatively, another set of throughput values can be calculated to use to test the algorithm 720.

In some embodiments, the auto scale monitor 710 uses the algorithm 720 to predict the future throughput (and/or bandwidth usage) of one or more gateways' Intranet, Internet, and/or VPC uplink interfaces. In some embodiments, this value is calculated using data collected for the last 30 minutes at one-minute intervals. Further information regarding the auto scale monitor 710 and the algorithm 720 used to predict bandwidth usage of a gateway will be described below.

After determining that future bandwidth usage of a gateway will exceed a threshold, the auto scale monitor 710 can identify one or more machines, and their logical segments, that are contributing to a high bandwidth usage of the gateway. Once the logical segments are determined, they can be provided to a segment group module 730. The segment group module 730 of some embodiments receives a set of logical segments that are consuming more bandwidth of a gateway (e.g., the gateway's Intranet uplink interface) than other machines that use the gateway. The segment group module 730 groups the logical segments based on the bandwidth consumption of the logical segments, the available set of gateways in the network, and the available set of host computers in the network. The logical segments can be grouped such that one group includes machines consuming less bandwidth and one or more other groups include machines consuming more bandwidth.

In some embodiments, the number of groups being created for the set of logical segments can be dependent on the number of hosts in the network and the number of allowed gateways in the network. For instance, the segment group module 730 can create two groups if only one additional gateway can be deployed along with the network's default gateway. Alternatively, the segment group module 730 can create three groups if two additional gateways can be deployed in the network. The segment group module 730 may also create a minimum number of groups needed to distribute bandwidth usage by machines across more than one gateway.

Once the segments are grouped, the segment group module 730 provides the segment groups and their associated prefixes (i.e., prefix network addresses) to the auto scale monitor 710. The auto scale monitor then provides the segment groups to an auto scaler 740. After receiving the segment groups (also referred to as subsets of segments), the auto scale monitor 710 invokes a routing group module 750 of the manager and controller set 700 to determine a routing group (also referred to as a route record group) for each segment group. For example, if a first group has the logical segments 192.168.1.0/24, 192.168.10.0/24, 192.168.20.0/24, and 172.168.10.0/24, the routing group module 750 determines that the common pattern of digits is 192.168. The number of common bits is counted, which, in this example, is 19. The routing group is found by setting the remaining bits to 0. Hence, the result is 192.168.0.0/19, where 19 is the number of common bits.

The routing group module 750 of some embodiments compares the first and second octet to find the routing group. In this example, the prefix network address of the routing group is 192.168. Because the first octet 192 equals 172, the logical segment with a prefix of 172.168. cannot be considered for determining the routing group along with the other logical segments. Hence, the routing group module 750 determines 192.168.0.0/20 and 172.168.10.0/24 as the routing group for this group. The routing group module 750 determines a routing group for each group, and provides the routing groups to the auto scaler 740.

The auto scaler 740 of some embodiments assigns each group to an available gateway in the network. In some embodiments, each group has a bandwidth tag which specifies the bandwidth usage of that group (e.g., low, high, etc.). One or more low bandwidth tagged groups are assigned to the default gateway of the network in some embodiments. The auto scaler 740 assigns high bandwidth tagged groups to one or more additional gateways of the network. If there are no currently deployed additional gateways (i.e., if there are not enough deployed gateways for the number of groups), the auto scaler 740 may create one or more new gateways and assign the groups to the new gateways. In some embodiments, one gateway is assigned only one segment group. In other embodiments, one gateway may be assigned more than one segment group.

If an auto scale out operation fails for any reason (e.g., success conditions are not met anymore), the auto scale out operation of the auto scaler 740 can be retried. In some embodiments, it is retried three times. If it fails after all retries, some embodiments send an alarm or notification to a network administrator notifying of the failed scale out and the reason for the failure. After receiving this alarm, the network administrator can fix the issue and retry the scale out operation.

Figure 8:
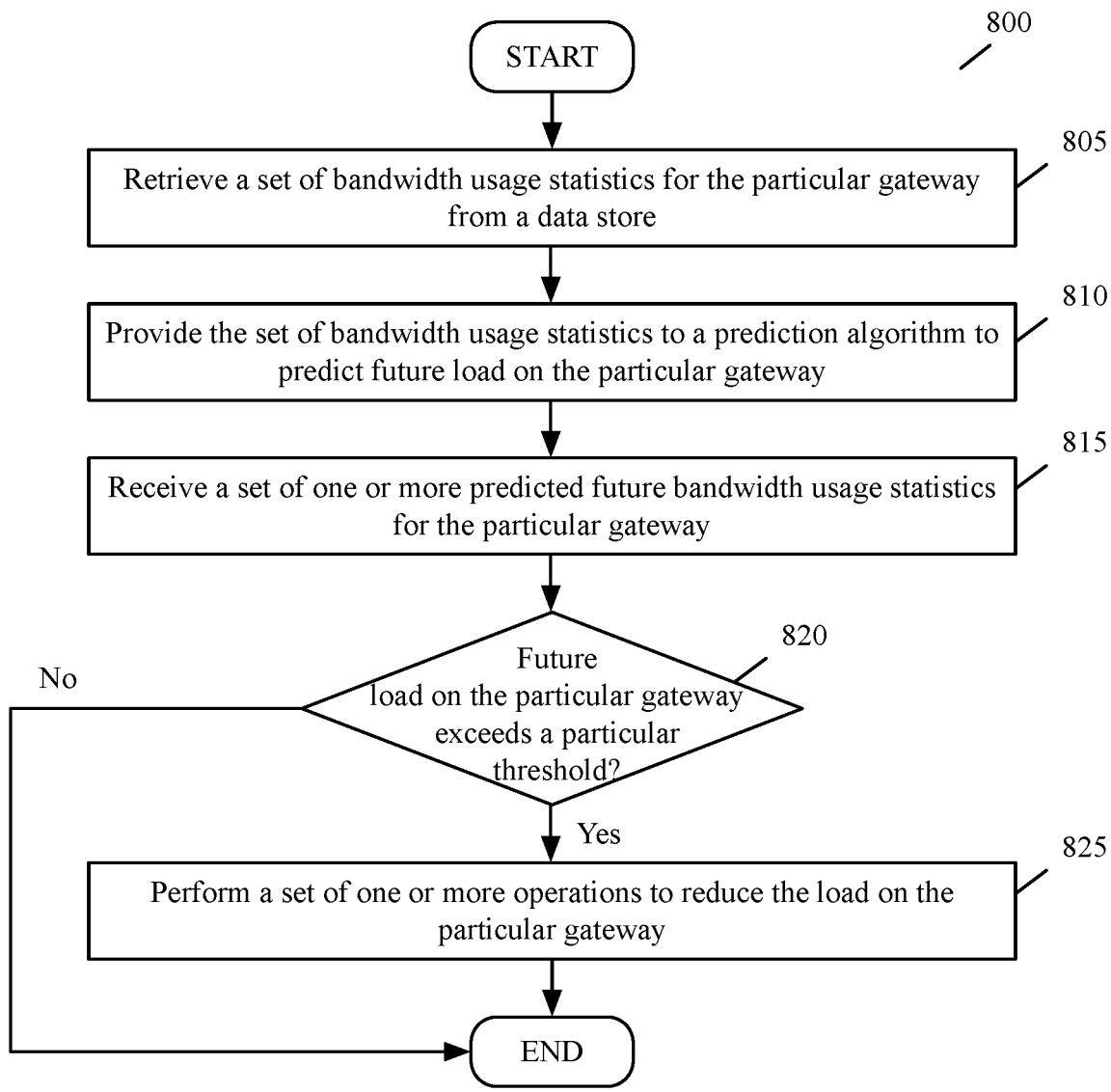
FIG. 8 conceptually illustrates a process of some embodiments for predicting bandwidth usage of a particular gateway at an auto scale monitor.

FIG. 8 conceptually illustrates a process 800 of some embodiments for predicting bandwidth usage of a particular gateway at an auto scale monitor. This process 800 is in some embodiments performed by an auto scale monitor program or module of a network, such as the auto scale monitor 710 of FIG. 7. In some embodiments, the process 800 is performed for the particular gateway at regular intervals (e.g., every five minutes).

The process 800 begins by retrieving (at 805) a set of bandwidth usage statistics for the particular gateway from a data store. In some embodiments, the auto scale monitor retrieves bandwidth usage statistics for a particular period of time, such as for the last 30 minutes. The retrieved bandwidth usage statistics are in some embodiments initially stored in the data store by a metrics collector that monitors the particular gateway. In different embodiments, the set of bandwidth usage statistics includes statistics associated with the particular gateway's Intranet uplink interface, Internet uplink interface, or both.

Next, the process 800 provides (at 810) the set of bandwidth usage statistics to a prediction algorithm to predict future load on the particular gateway. The algorithm, which may be similar to the algorithm 720 of FIG. 7, may be a time-series algorithm that uses historical series data in order to predict future values of the series. Using past bandwidth usage statistics for the particular gateway, the algorithm can predict future bandwidth usage statistics of the particular gateway, thereby predicting the utilization percentage of the particular gateway (i.e., the particular gateway's Intranet, Internet, and/or VPC uplink interface) by machines that use the particular gateway.

After providing the set of bandwidth usage statistics to the algorithm, the process 800 receives (at 815) a set of one or more predicted future bandwidth usage statistics for the particular gateway. The auto scale monitor in some embodiments receives, from the prediction algorithm, a predicted future bandwidth usage percentage for each minute of the next 30 minutes. When the auto scale monitor provides bandwidth usage statistics for only one uplink of the particular gateway (e.g., only the Intranet uplink), the auto scale monitor receives predicted bandwidth usage statistics for only that uplink. When the auto scale monitor provides bandwidth usage statistics for multiple uplinks of the particular gateway (e.g., the Intranet, Internet, and VPC uplinks), the auto scale monitor may receive a different set of predicted future bandwidth usage statistics for the different uplinks. Alternatively or conjunctively, the auto scale monitor may receive a set of future bandwidth statistics that combines the usage of the multiple uplinks.

After receiving the set of predicted future bandwidth usage statistics for the particular gateway, the process 800 determines (at 820) whether future load on the particular gateway exceeds a particular threshold. In some embodiments, the auto scale monitor receives predictions of future utilization of one or more of the particular gateway's uplink interfaces, and determines whether they exceed a threshold percentage specified by a network administrator or user. For example, the particular threshold may be 80%.

In some embodiments, the auto scale monitor checks whether multiple prediction values of the bandwidth usage percentage in the set of predicted future bandwidth usage statistics reach or exceed the threshold. For example, the auto scale monitor may check to see if the predicted bandwidth usage percentage is at or above 80% for five minutes of the 30 predicted minutes.

If the process 800 determines that the future load on the particular gateway does not exceed the particular threshold, the process 800 ends. If the process 800 determines that the future load on the particular gateway does exceed the particular threshold, the process 800 performs (at 825) a set of one or more operations to reduce the load on the particular gateway. In some embodiments, the set of operations includes identifying a subset of machines consuming more bandwidth of the particular gateway, and distributing forwarding rules to the subset of machines to use another gateway. The other gateway may be already deployed, or may be deployed during the performance of the set of operations to reduce the load on the particular gateway. Then, the process 800 ends.

In some embodiments, a second lesser threshold is specified along with a first threshold that triggers reducing the load on a gateway. Exceeding the second threshold (but not exceeding the first threshold) may cause the auto scale monitor to send a notification or alarm to a network administrator or user that the gateway is at risk of being overloaded. For example, after determining that a gateway's predicted future load exceeds the second threshold, the auto scale monitor may assign a "yellow" indication to the gateway to notify a possible overutilization of the gateway (i.e., of the gateway's uplink). A third threshold between the first and second thresholds may also be defined, and after determining that a gateway's predicted future load exceeds the third threshold, the auto scale monitor may assign an "orange" indication to the gateway to indicate server degradation of the gateway.

Figure 9:
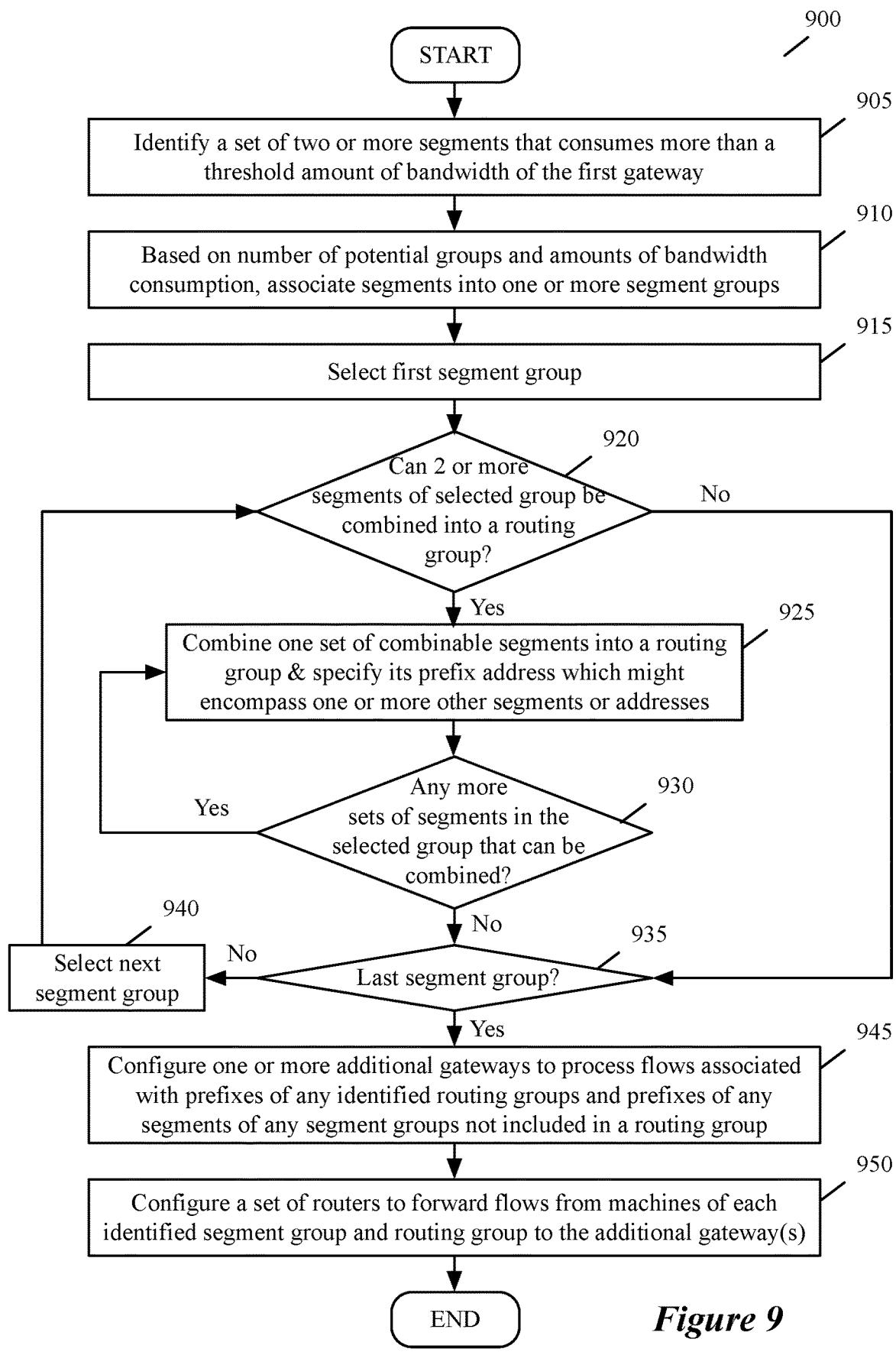
FIG. 9 conceptually illustrates a process of some embodiments for dynamically deploying gateways for a first network connecting several machines.

FIG. 9 conceptually illustrates a process 900 of some embodiments for dynamically deploying gateways for a first network connecting several machines. The process 900 is in some embodiments performed by a cluster of one or more servers (e.g., a manager and/or controller) of the first network. More specifically, the process 900 in some embodiments is performed by an auto scale monitor program or module, a segment group module, an auto scaler program or module, and a routing group module or program of a server cluster, such as the auto scale monitor 710, segment group module 730, auto scaler 740, and routing group module 750 of FIG. 7.

In some embodiments, the process 900 is performed after determining that the load on the first gateway exceeds a threshold (e.g., after process 800 of FIG. 8). In some embodiments, each segment of the first network is a segment of a logical overlay network. In other embodiments, each segment of the first network is a segment of a physical network. The first gateway is in some embodiments a standalone gateway device in the first network, and is implemented on a host computer in the first network in other embodiments. In some embodiments, the first gateway is defined at the boundary of the first network to connect to one or more external networks.

The process 900 begins by identifying (at 905) a set of two or more segments, including at least first and second segments, that consumes more than a threshold amount of bandwidth of the first gateway. In some embodiments, the auto scale monitor identifies the segments consuming more bandwidth of the first gateway than other segments in the first network by first identifying machines consuming more bandwidth than others, and then identifying the segments to which those machines belong. For example, the auto scale monitor may use bandwidth metrics (e.g., throughput values) and a specified threshold to determine which machines' bandwidth metrics exceed that threshold. After determining the machines that exceed the threshold, the auto scale monitor identifies the segments to which each machine belongs.

The auto scale monitor of some embodiments identifies the set of segments consuming more than a threshold amount of current bandwidth of the first gateway. A current bandwidth consumption of the first gateway is in some embodiments identified using current bandwidth consumption metrics for each segment (i.e., for each machine in each segment) in the network. In other embodiments, the auto scale monitor identifies the set of segments consuming more than a threshold amount of predicted future bandwidth of the first gateway. A predicted future bandwidth consumption of the first gateway is in some embodiments identified using a set of previously collected (i.e., historical) bandwidth consumption metrics of each segment in the first network. In some embodiments, the auto scale monitor identifies the set of segments consuming more than the threshold amount of bandwidth of a particular uplink interface of the first gateway. This particular uplink interface may be the Intranet, Internet, or VPC uplink interface of the first gateway.

As described above, some embodiments identify a set of segments consuming more than a threshold amount of the first gateway's bandwidth. In other embodiments, the process 900 identifies (at 905) a set of two or more segments that consume any amount of bandwidth of the first gateway. More specifically, the process 900 identifies all segments in the first network using the first gateway, and uses this entire set of segments for the proceeding steps 910-950. This is performed in some embodiments after determining that the current or a predicted future load on the first gateway by all segments exceeds a threshold in order to group all segments into multiple segment groups based on bandwidth consumption and keep the lowest bandwidth consuming segment group using the first gateway.

Based on a number of potential groups and based on amounts of bandwidth consumption, the process 900 associates (at 910) the identified segments into one or more segment groups. More specifically, the process 900 associates segments into segment groups with each segment group including segments consuming a similar amount of bandwidth of the first gateway. In some embodiments, each segment group includes two or more members, i.e., two or more segments. The segment group module of some embodiments receives the identified set of segments from the auto scale monitor, and associates segments into segment groups based on the number of potential segment groups. In some embodiments, the first network is only able to deploy a certain number of gateways, which is in some embodiments based on the number of available hosts in the first network that can execute a gateway. For example, if the first network can have a maximum number of two gateways, the segment group module can group the identified segments into up to two segment groups. If the first network can have a maximum number of five gateways, the segment group module can group the identified segments into up to five segment groups.

The segment group module associates segments into segment groups also based on their bandwidth consumption of the first gateway. For example, some embodiments identify a first group of segments consuming a higher amount of bandwidth than a second group of segments. The segment group module of some embodiments identifies these groups of segments in order to categorize each segment into a segment group based on their bandwidth consumption relative to the other segments. In some embodiments, the criteria for associating segments into segment groups includes specified ranges of values associated with bandwidth consumption of each segment. For example, the segment group module in some embodiments creating three segment groups (1) groups segments consuming less than a 10 megabits per second (Mbps) into a first segment group, (2) groups segments consuming between 10 Mbps and 50 Mbps into a second segment group, and (3) groups segments consuming more than 50 Mbps into a third segment group. These range values may be specified by a network administrator, or may be determined by the segment group module based on the minimum and maximum bandwidth consumption values of the segments and the number of potential segment groups.

In some embodiments, each segment group is associated with a particular tag indicating an amount of bandwidth the segment group consumes. For instance, a first segment group is in some embodiments associated with a first tag indicating a low amount of bandwidth used by machines in the first segment group, while a second segment group is associated with a second tag indicating a high amount of bandwidth used by machines in the second segment group. These tags determine on which gateway each segment group is to forward traffic. For example, in some embodiments, the first gateway is a default gateway, so one or more segment groups with a low bandwidth usage tag are to be assigned to the first gateway, while segment groups with a high bandwidth usage tag are assigned to other gateways. Some embodiments direct the lowest bandwidth consuming segment group to use the default gateway, while the other segment groups are directed to use one or more other gateways.

The segment group module of some embodiments provides the segment groups to the auto scale monitor, which provides them to the auto scaler. In some embodiment, a particular segment group is not provided to the auto scaler. In such embodiments, the particular segment group consumes the least amount of bandwidth of all segment groups, and the auto scale monitor leaves the particular segment group to continue using the first gateway.

The grouping operation of step 910 in some embodiments identifies one or more segment groups with each segment group including several network address segments. In order to forward data message flows to gateways of the first network that process the data message flows for these segments, some embodiments generate multiple routing records (also referred to as route records) and distribute the routing records to multiple routers in the first network. To reduce the number of routing records that are generated for the segments, the process 900 in some embodiments performs the following operations 915-940 to try to identify one or more routing groups that associate two or more segments in each segment group, and then generate routing records based on these routing groups.

At 915, the process 900 selects a first segment group. After receiving segment groups, the auto scaler invokes the routing group module to create a route record group or routing group (i.e., one or more routing groups for each segment group). After selecting a first segment group, the process 900 determines (at 920) whether two or more segments of the selected segment group can be combined into a routing group. Segments may be combined into a routing group by (1) identifying a common prefix network address (e.g., a common prefix IP address) shared by the segments, and (2) identifying a common number of bits of the segments.

If the process 900 determines that the selected segment group does not include two or more segments that can be combined into a routing group (e.g., no two segments share a common prefix), the process 900 proceeds to step 935. At 935, the process 900 determines whether the selected segment group is the last segment group, i.e., the process 900 determines whether there are any other segment groups that have not yet been selected. If the process 900 determines that the selected segment group is not the last segment group, the process selects (at 940) a next segment group, and returns to step 920. If the process 900 determines that the selected segment group is the last segment group, the process 900 proceeds to step 945, which will be described further below.

Figure 10:
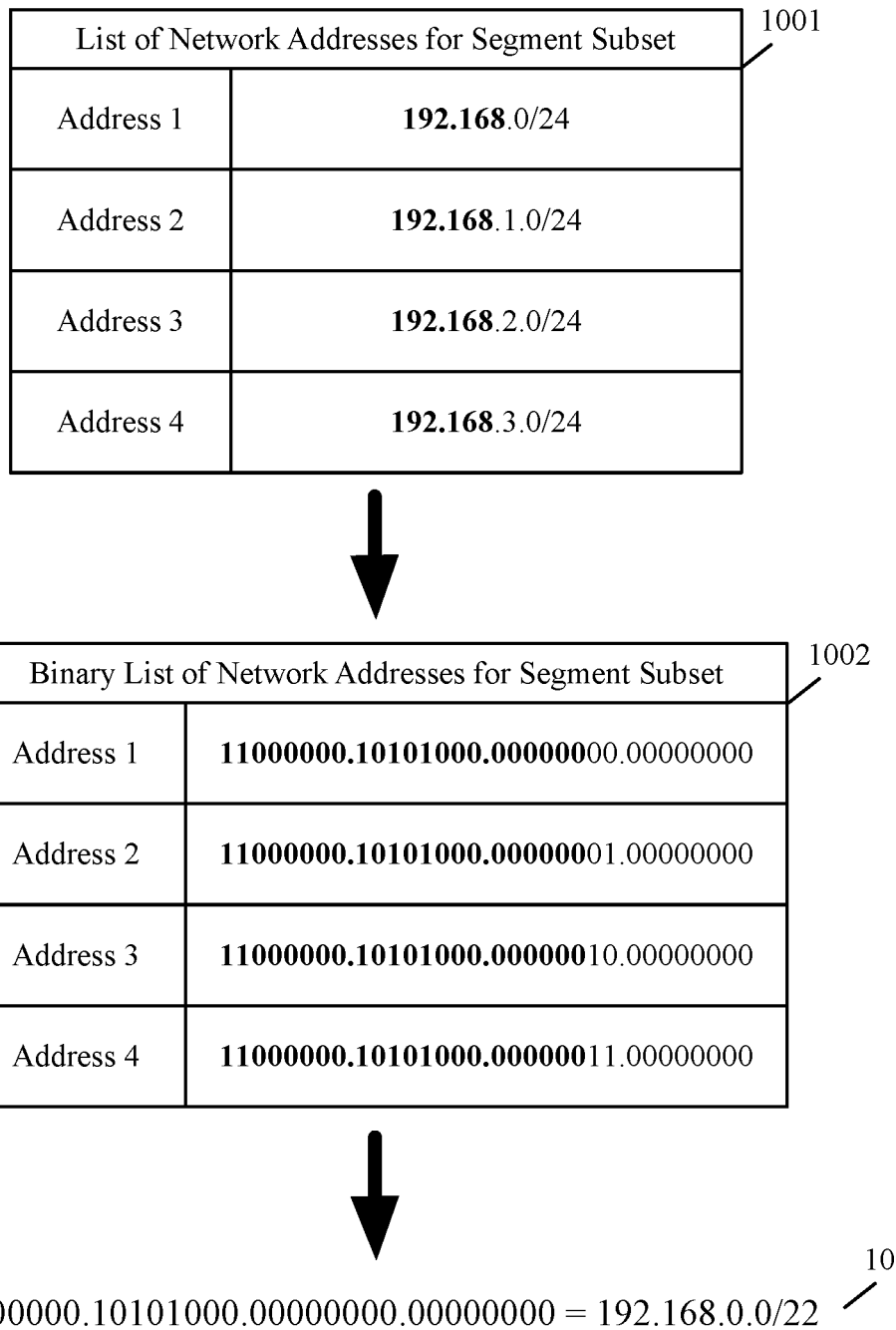
FIG. 10 illustrates stages for aggregating segments in order to identify a segment group.

If the process 900 determines that the selected segment group includes two or more segments that can be combined into a routing group, the process 900 combines (at 925) one set of combinable segments into a routing group and specifies the prefix network address for the routing group, which, in some embodiments, encompasses one or more other segments or addresses. Combining combinable segments into a routing group is also referred to as determining or identifying a routing group. FIG. 10 illustrates stages for combining segments in order to identify a routing group. A routing group module, such as the routing group module 750 of FIG. 7, may determine a routing group for segments using this process. Stage 1001 illustrates a list of network addresses for a particular segment subset of a segment group identified to include segments that can be combined into a routing group. In this example, the particular segment subset includes four network addresses. Using these network addresses, the routing group module identifies a common prefix network address which, in this example, is 192.168 (as shown in bold).

Then, for each network address, the routing group module determines the binary form at stage 1002. Using the binary form for each network address, the routing group module determines the common number of bits in each network address. The common number of bits is the number of digits in the binary form each network address has in common. In this example, the common number of bits, which are bolded, is 22.

At stage 1003, the routing group module determines the routing group by writing the common number of bits, and setting all remaining bits to zero. In this example, the last 10 bits are set to zero. Then, the routing group module uses the identified common prefix network address and the common number of bits to determine the routing group for these segments. In this example, the determined routing group is 192.168.0.0/22, which includes the common prefix, the common number of digits (i.e., 22), and all other digits are set to 0.

The final routing group at stage 1003 is an aggregation of the segments' network addresses listed in stage 1001. In some embodiments, the determined routing group is associated with other segments not in the particular segment subset shown in state 1001. For example, for this routing group, the segment 192.168.4.0/24 is part of the routing group, but was not initially identified as part of the particular segment subset (and, therefore was not part of the segment group). In such embodiments, the routing group module (or an auto scaler) determines whether the other segment is part of another segment group (i.e., part of another group created by a segment group module). If it is part of another segment group, it can either be removed from the other segment group or the routing group module will not combine the particular segment subset into the routing group.

If it is not part of another segment group, the routing group module or auto scaler can keep the determined routing group as the routing group for the particular segment subset, and the other segment will now be included in the particular segment subset and its segment group. Combining segments into routing groups, and including additional segments into a routing group, is performed in some embodiments in order to reduce match criteria for forwarding rules. Using a common prefix network address as the match criteria for a particular forwarding rule directs, to a gateway, data message flows associated with multiple machines of multiple segments using only one forwarding rule. This improves efficiency and saves storage space for routing records.

Referring back to FIG. 9, after combining the set of combinable segments of the selected segment group into a routing group, the process 900 determines (at 930) whether the selected segment group includes any more sets of segments that can be combined. If a first created routing group includes only a subset of the segment group's segments, and if two or more other segments are combinable into a different routing group (e.g., if two or more segments share a different prefix network address than the first routing group), the process 900 returns to step 925 to combine these segments into another routing group. If the process 900 determines that all segments of the selected segment group have been combined into a routing group, and/or if no other segments are able to be combined, the process 900 proceeds to step 935.

At 935, the process 900 determines whether the selected segment group is the last segment group, i.e., the process 900 determines whether there are any other segment groups that have not yet been selected and combined into routing groups at steps 920-930. If the process 900 determines that the selected segment group is not the last segment group, the process selects (at 940) a next segment group, and returns to step 920. If the process 900 determines that the selected segment group is the last segment group, the process 900 proceeds to step 945.

At 945, the process 900 configures one or more additional gateways to process flows associated with prefixes of any identified routing groups and prefixes of any segments of any segment groups not included in a routing group. The additional gateways are in some embodiments standalone gateway devices in the first network, and are implemented on a set of one or more host computers in the first network in other embodiments.

After the routing group module has determined all possible routing groups for each segment group, the auto scaler of some embodiments deploys an additional gateway for each segment group such that no two segment groups are associated with the same additional gateway. In other embodiments, the auto scaler deploys one additional gateway for all segment groups.

For each segment group, the auto scaler configures a gateway (1) to process flows associated with each prefix of each routing group created from the segment group, and (2) to process flows associated with each prefix of segments not included in any routing groups. For example, if a particular segment group includes four segments, and three of them were combined into one routing group, the auto scaler configures the gateway with a first routing record to process flows associated with the prefix of the routing group and a second routing record to process flows associated with the prefix of the fourth segment not combined into the routing group. In some embodiments, a single segment includes only one network address (e.g., one IP address). In such embodiments, the second routing record is associated with the single network address. If an entire segment group was combined into one routing group, the auto scaler configures the gateway with a single routing record to process flows associated with only the prefix of the routing group. If no segments of a segment group were combined into a routing group, the auto scaler configures the gateway with a different routing record for each segment to process flows associated with all prefixes of all segments in the segment group.

Before configuring the one or more additional gateways, some embodiments first deploy the additional gateways in the first network. In such embodiments, the additional gateways are deployed and configured in the first network in order to alleviate load on the first gateway. By deploying additional gateways to connect to one or more external networks, the first gateway forwards less flows to and from the external networks than if it were the only gateway in the first network.

Some embodiments, before deploying additional gateways, determine that the first gateway is the only gateway currently deployed in the first network to connect to the one or more external networks. In other embodiments, one or more additional gateways are already deployed in the first network, but do not forward flows from machines in any segment. In such embodiments, the auto scaler may not need to deploy any additional gateways, as long as there are enough for the number of segment groups. Alternatively, if more additional gateways need to be deployed based on the number of segment groups, the auto scaler deploys these additional gateways.

Lastly, the process 900 configures (at 950) a set of routers to forward flows from machines of each identified segment group and routing group to the one or more additional gateways. The set of routers is in some embodiments the internal routing fabric of the first network, while the first and additional gateways are defined at the boundary of the first network to connect to one or more external networks. In some embodiments, the routers are standalone routers. In other embodiments, the routers are implemented on one or more host computers in the first network.

In some embodiments, the set of routers is configured by distributing forwarding rules or routing records to the set of routers, with each routing record specifying one routing group or one segment not part of a routing group. Each routing group and each segment not included in a routing group is associated with its own routing record in order to forward data message flows from the machines of each segment to the external network through the additional gateways. For example, a first routing record in some embodiments specifies a particular routing group and a second gateway of the first network in order for the set of routers to forward flows from machines in the particular routing group to the second gateway. A second routing record in some embodiments specifies a particular segment and a third gateway of the first network in order for the set of routers to forward flows from machines in the particular segment to the third gateway.

After configuring the set of routers, the process 900 ends. In some embodiments, the process 900 is performed each time an auto scale monitor determines that a gateway (e.g., the first gateway, the second gateway, etc.) in the first network is being overloaded or may be overloaded in the future in order to alleviate the load on the gateway.

Figure 11:
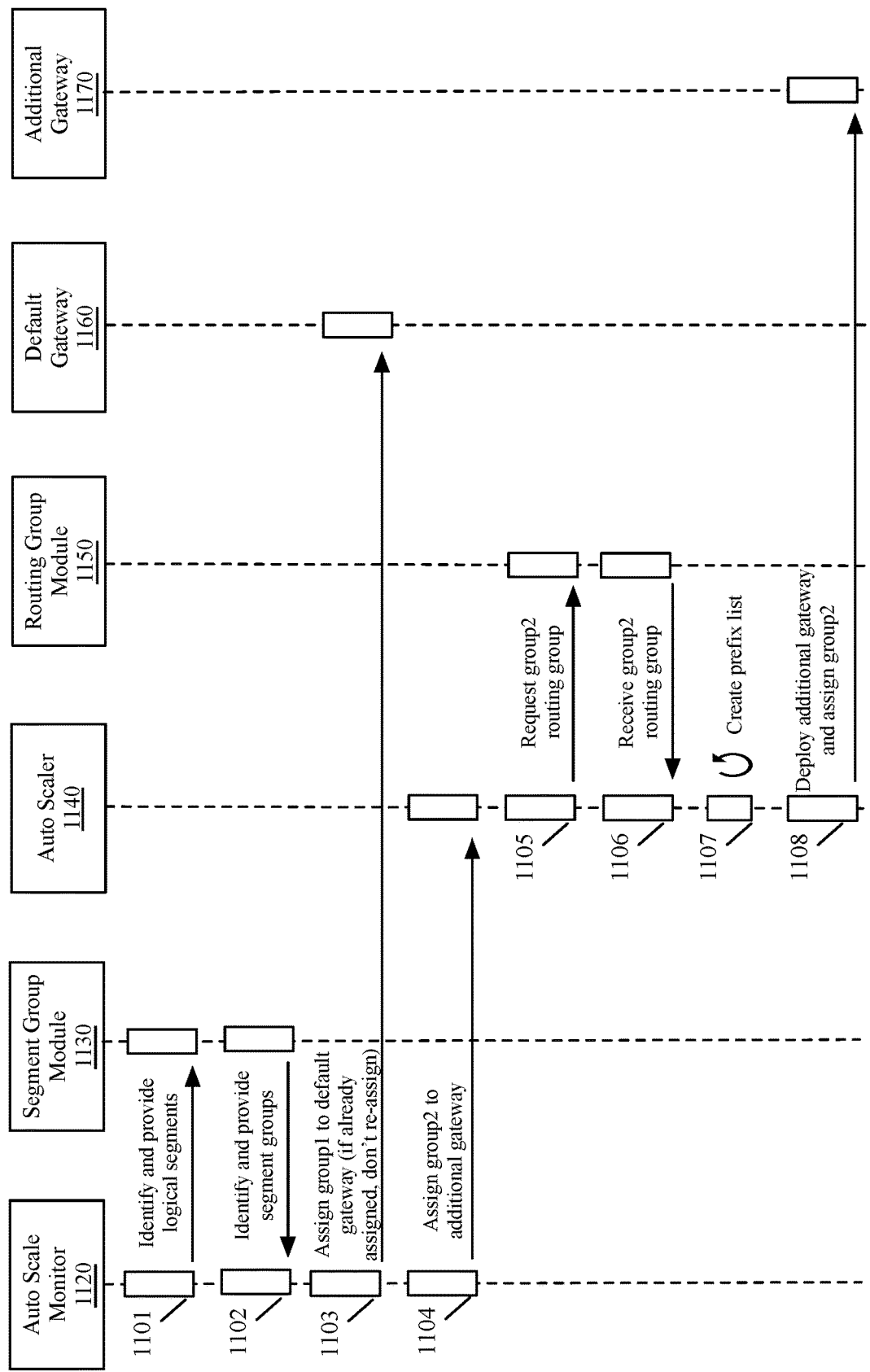
FIG. 11 conceptually illustrates example communications between an auto scale monitor, a segment group module, an auto scaler, and a routing group module for dynamically grouping VMs after a determination that a default gateway may become overloaded in the future.

FIG. 11 conceptually illustrates example communications between an auto scale monitor 1120, a segment group module 1130, an auto scaler 1140, and a routing group module 1150 for dynamically grouping VMs after a determination that a default gateway 1160 may become overloaded in the future. In this example, the auto scale monitor 1120 has determined a set of VMs operating in a first network may exceed a threshold amount of bandwidth usage of an Intranet uplink interface of the default gateway 1160. This first network may be a cloud datacenter, and the Intranet uplink interface may connect the set of VMs to on-premises machines in an on-premises datacenter.

At 1101, the auto scale monitor 1120 identifies logical segments and provides the identified logical segments to the segment group module 1130. To identify the logical segments, the auto scale monitor 1120 may first identify the IP addresses of VMs consuming bandwidth of the default gateway 1160, and use the identified IP addresses to identify the logical segments.

After the auto scale monitor 1120 provides the logical segments, at 1102, the segment group module 1130 identifies and provides segment groups (also referred to as subsets of segments or segment groups) to the auto scale monitor 1120. The segment group module 1130 groups all segments of the received logical segments into one or more segment groups, which may be based on policies specified by a network administrator, in some embodiments. For instance, the segment group module 1130 can group segments based on the bandwidth consumption of the logical segments, the number of available gateways in the network, and the number of available hosts in the network. Once the segment group module 1130 creates these groups, it provides the groups to the auto scale monitor 1120 for the auto scale monitor to know where to place each logical segment (i.e., which gateway to assign each VM's traffic to). In this example, the segment group module 1130 has identified two segment groups (group1 and group2) to provide to the auto scale monitor 1120.

At 1103, the auto scale monitor 1120 assigns group1 to the default gateway 1160. In this example, group1 includes VMs consuming less bandwidth than the VMs in group2, so group1 is assigned the default gateway 1160 of the network. In some embodiments, the auto scale monitor 1120 does not assign group1 to the default gateway 1160 because it is already assigned. In such embodiments, the auto scale monitor 1120 does not perform any operations for group1.

In this example, the additional gateway 1170 has not yet been deployed in the network, so, at 1104, the auto scale monitor 1120 directs the auto scaler 1140 to deploy the additional gateway 1170 and assign group2 to it. In other embodiments, the auto scale monitor 1120 also directs the auto scaler 1140 to assign group1 to the default gateway 1160.

After receiving direction to deploy the additional gateway 1170, at 1105, the auto scaler 1140 requests a routing group for each segment group (i.e., group1 and group2) from the routing group module 1150. The routing group created for group2 is the routing group created from the segments in group2, which can be determined as described above in relation to FIGS. 7, 9, and 10. Once the routing group module 1150 determines a routing group for group2, it provides it at 1106 to the auto scaler 1140.

After receiving group2's routing group, at 1107, the auto scaler 1140 uses the routing group to create a prefix list for group2 that includes the prefix network addresses of the segments in group2. Then, at 1108, the auto scaler 1140 deploys the additional gateway 1170 and assigns group2 to the additional gateway 1170. Specifically, the created prefix list and routing group is associated with the additional gateway 1170.

In some embodiments, a successful scale out operation of gateways, such as the process described in FIG. 11, includes identifying a set of segments, creating an association map with the identified segments, and associating the segments' prefixes to a newly deployed gateway. A successful scale out operation of gateways also means that there is no traffic impact on the VMs and services running on the gateway.

Figure 12:
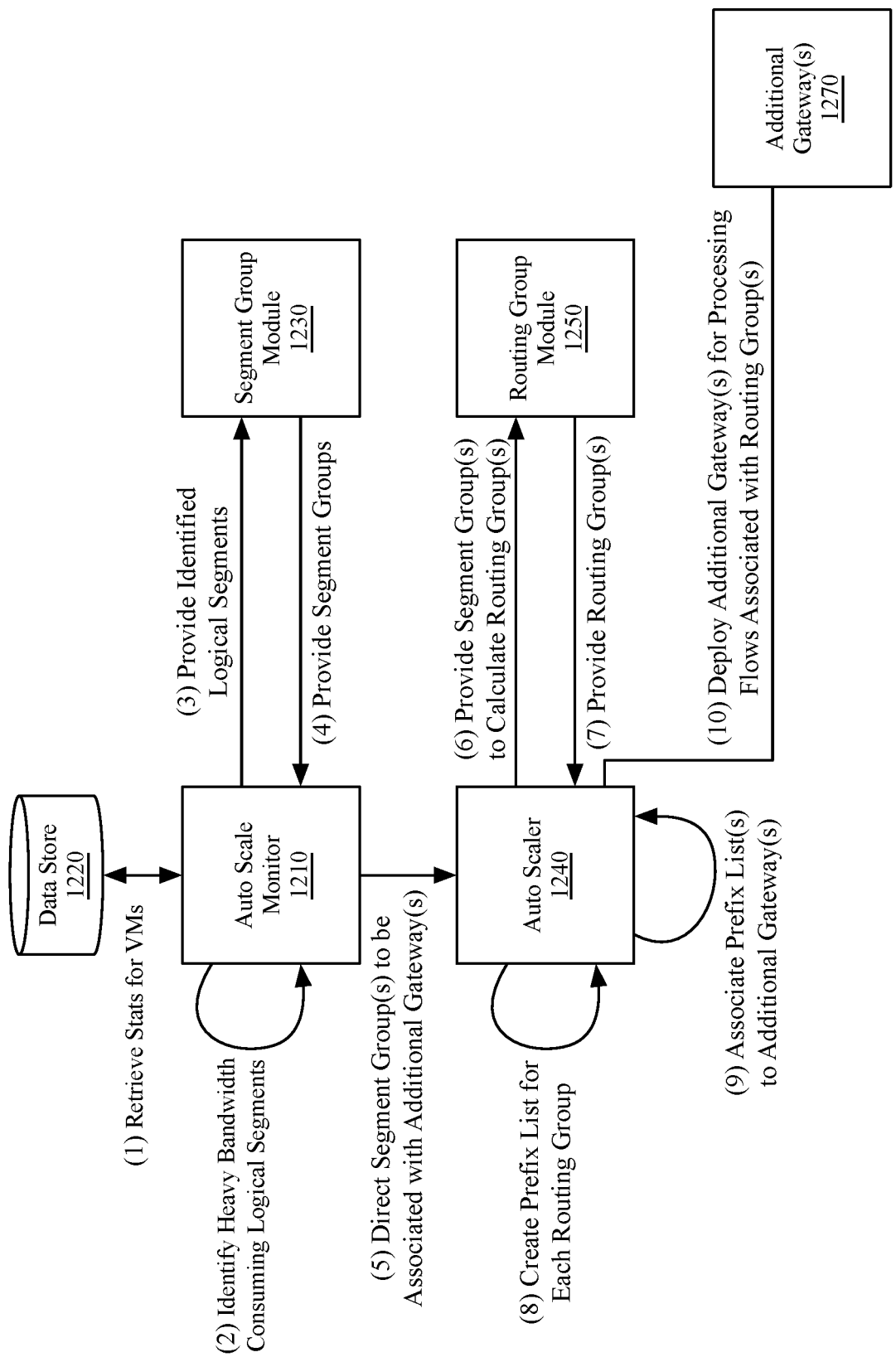
FIG. 12 conceptually illustrates more in-depth example communications between an auto scale monitor, a segment group module, an auto scaler, and a routing group module for dynamically grouping VMs after a determination that a default gateway may become overloaded in the future.

FIG. 12 illustrates a more in-depth view of communications between an auto scale monitor 1210, a data store 1220, a segment group module 1230, an auto scaler 1240, and a routing group module 1250 for dynamically grouping VMs after a determination that a default gateway may become overloaded in the future. In this example, the auto scale monitor 1210 has determined a set of VMs operating in a first network may exceed a threshold amount of bandwidth usage of an Intranet uplink interface of the default gateway. This first network may be a cloud datacenter, and the Intranet uplink interface may connect the set of VMs to on-premises machines in an on-premises datacenter.

First, the auto scale monitor 1210 retrieves bandwidth statistics (e.g., throughput value metrics) for VMs from a data store 1220. This data store 1220 is in some embodiments a data store that stores bandwidth metrics for machines and gateways, such as the data store 715 of FIG. 7. In some embodiments, the auto scale monitor 1210 retrieves statistics for all VMs in the first network. In other embodiments, the auto scale monitor 1210 retrieves statistics only for the set of VMs it identified as consuming a threshold amount of bandwidth of the default gateway.

After retrieving statistics for VMs, the auto scale monitor 1210 identifies heavy bandwidth consuming logical segments. In some embodiments, the auto scale monitor 1210 identifies the logical segments to which each VM belongs, and for each logical segment, determines the bandwidth consumption of the logical segment based on the bandwidth consumption of each VM in the logical segment. For example, for a logical segment that includes three VMs, the auto scale monitor 1210 of some embodiments combines the throughput values for each VM to determine the overall throughput for the logical segment.

In some embodiments, the auto scale monitor 1210 determines which logical segments are heavy bandwidth consuming segments by determining which logical segments exceed a threshold amount of bandwidth consumption. In other embodiments, the auto scale monitor 1210 determines which logical segments are heavy bandwidth consuming segments by first ordering (e.g., ranking) the logical segments according to their bandwidth consumption, and then identifying a particular range of logical segments at the high bandwidth consumption end of the ordering. For example, the auto scale monitor of some embodiments identifies the top five bandwidth consuming logical segments.

Still, in other embodiments, the auto scale monitor determines which logical segments are heavy bandwidth consuming segments by first ordering (e.g., ranking) the logical segments according to their bandwidth consumption, and then identifying a range of logical segments at the high bandwidth consumption end of the ordering that exceed the threshold amount of bandwidth of the default gateway. For example, if the auto scale monitor 1210 identifies five logical segments, and the three lowest bandwidth consuming logical segments do not, in combination, exceed the default gateway's bandwidth consumption threshold, the other two logical segments are identified as the heavy bandwidth consumption logical segments. Any suitable process for identifying heavy bandwidth consumption segments may be performed.

After identifying heavy bandwidth consuming logical segments, the auto scale monitor 1210 provides the identified logical segments to the segment group module 1230. More specifically, the auto scale monitor 1210 provides the IP addresses of the identified logical segments to the segment group module 1230. For example, if the IP addresses of the machines in the identified logical segments includes 192.168.1.2, 192.168.10.2, 192.168.20.4, and 172.168.10.2, the identified logical segments would be 192.168.1.0/24, 192.168.10.0/24, 192.168.20.0/24, and 172.168.10.0/24.

Using the received logical segments, the segment group module 1230 groups the logical segments into segment groups based on the bandwidth consumption of each logical segment. In some embodiments, the segment group module 1230 groups the logical segments based on the number of hosts available in the first network and the number of gateways present in the first network. The segment group module 1230 of some embodiments groups the logical segments into a first low-bandwidth group and one or more other high-bandwidth groups. The low-bandwidth group includes logical segments consuming the least amount of bandwidth of all logical segments the segment group module 1230 received from the auto scale monitor 1210.

Then, the segment group module 1230 provides the created segment groups to the auto scale monitor 1210. After receiving the segment groups, the auto scale monitor 1210 directs the auto scaler 1240 to place the segment groups on one or more additional gateways. In some embodiments, a first group includes the lowest bandwidth-consuming logical segments, while the other groups include higher bandwidth-consuming groups. In such embodiments, the auto scale monitor 1210 does not provide the first group to the auto scaler 1240 in order for the machines in the first group to continue using the default gateway. In other embodiments, all segment groups are provided to the auto scaler 1240 to associate with one or more additional gateways.

After receiving a set of one or more segment groups to place onto one or more additional gateways, the auto scaler 1240 provides the set of segment groups to the routing group module 1250 to determine a routing group for each segment group. For example, if the auto scaler 1240 gives the routing group module 1250 a segment group including segments 192.168.1.0/24 and 192.168.10.0/24, the routing group module 1250 determines the routing group to be 192.168.0.0/19. If the given segment group includes segments 172.168.10.0/24 and 172.168.20.0/24, the routing group module 1250 determines the routing group to be 172.168.0.0/19. The routing group module 1250 may determine the routing group as described above in relation to FIGS. 7, 9, and 10.

After determining the routing group for each segment group in the given set of segment groups, the routing group module 1250 provides the routing groups to the auto scaler 1240. Then, the auto scaler 1240 creates a prefix list for each received routing group. In some embodiments, a prefix list is in the form of an API. After creating a prefix list for each routing group, the auto scaler 1240 associates each prefix list to an additional gateway 1270. In some embodiments, all prefix lists are associated with one additional gateway 1270. In other embodiments, each prefix list is associated with its own additional gateway 1270.

After associating each prefix list to an additional gateway 1270, the auto scaler 1240 deploys a set of one or more additional gateways 1270 and configures each additional gateway in the set of additional gateways to process flows associated with the prefix list associated with it. In some embodiments, one or more additional gateways 1270 are already deployed in the first network, so the auto scaler 1240 only configures the additional gateways that are already deployed. In other embodiments, the auto scaler 1240 deploys all additional gateways 1270 needed for the prefix lists. Still, in other embodiments, the auto scaler 1240 deploys a first subset of additional gateways, while a second subset of additional gateways are already deployed and only need to be configured.

Figure 13:
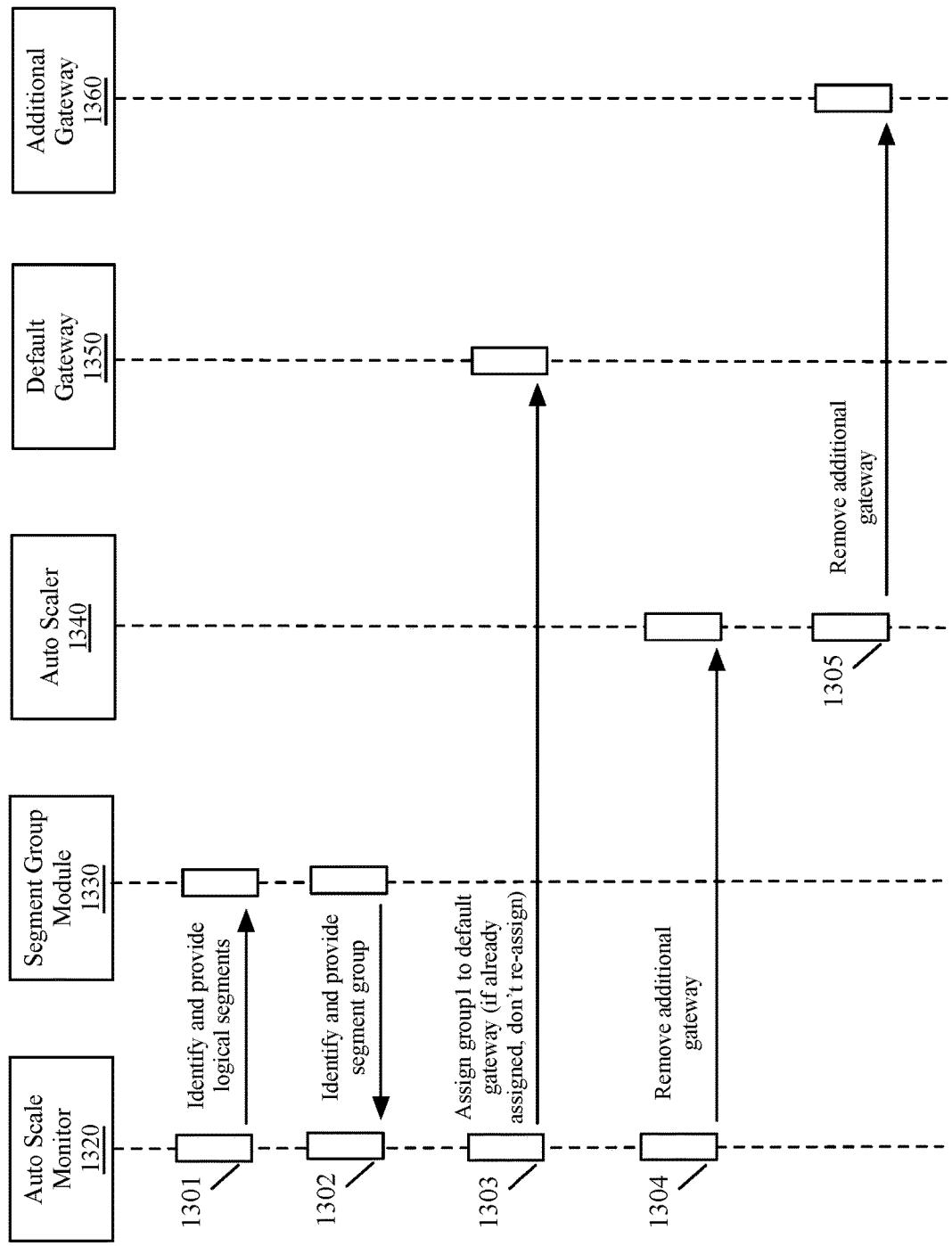
FIG. 13 conceptually illustrates example communication between an auto scale monitor, a segment group module, and an auto scaler to reduce gateways in a network that includes a default gateway and an additional gateway.

In some embodiments, utilization of gateways is monitored in order to scale, i.e., reduce the number of, gateways in a network. FIG. 13 conceptually illustrates example communication between an auto scale monitor 1320, a segment group module 1330, and an auto scaler 1340 to reduce gateways in a network that includes a default gateway 1350 and an additional gateway 1360. This communication may be conducted after the auto scale monitor 1320 determines that both gateways are being underutilized, and it is more efficient to use only one gateway instead of both. Steps 1301 and 1302 are similar to steps 1101 and 1102 of FIG. 11, where the auto scale monitor 1320 identifies and provides logical segments to the segment group module 1330, and the segment group module 1330 identifies and provides a segment group to the auto scale monitor 1320.

Because the VMs in the network are underutilizing gateways 1350 and 1360, the auto scale monitor 1320 identifies the VMs using both gateways and provides their logical segments to the segment group module 1330. The segment group module 1330 groups all of these logical segments into a single segment group, meaning that traffic of all of the VMs is to be exchanged using one gateway (i.e., the default gateway of the network). At 1303, the auto scale monitor 1320 assigns the one segment group to the default gateway 1350. In some embodiments, the auto scale monitor 1320 does not assign group1 to the default gateway 1350 because it is already assigned. In such embodiments, the auto scale monitor 1320 does not perform any operations for group1. In other embodiments, a first subset of logical segments is already assigned to the default gateway 1350, and a second subset of logical segments is not yet assigned to the default gateway 1350 (e.g., it was previously assigned to the additional gateway 1360). In such embodiments, the auto scale monitor 1320 assigns the second subset to the default gateway 1350, and does not re-assign the first subset to the default gateway 1350. Then, at 1304, the auto scale monitor 1320 directs the auto scaler 1340 to remove the additional gateway 1360 from the network at 1305.

Alternatively, the auto scale monitor 1320 in some embodiments provides the one segment group to the auto scaler 1340, and the auto scaler assigns it to the default gateway 1350 and removes the additional gateway 1360 from the network at 1305.

Figure 14:
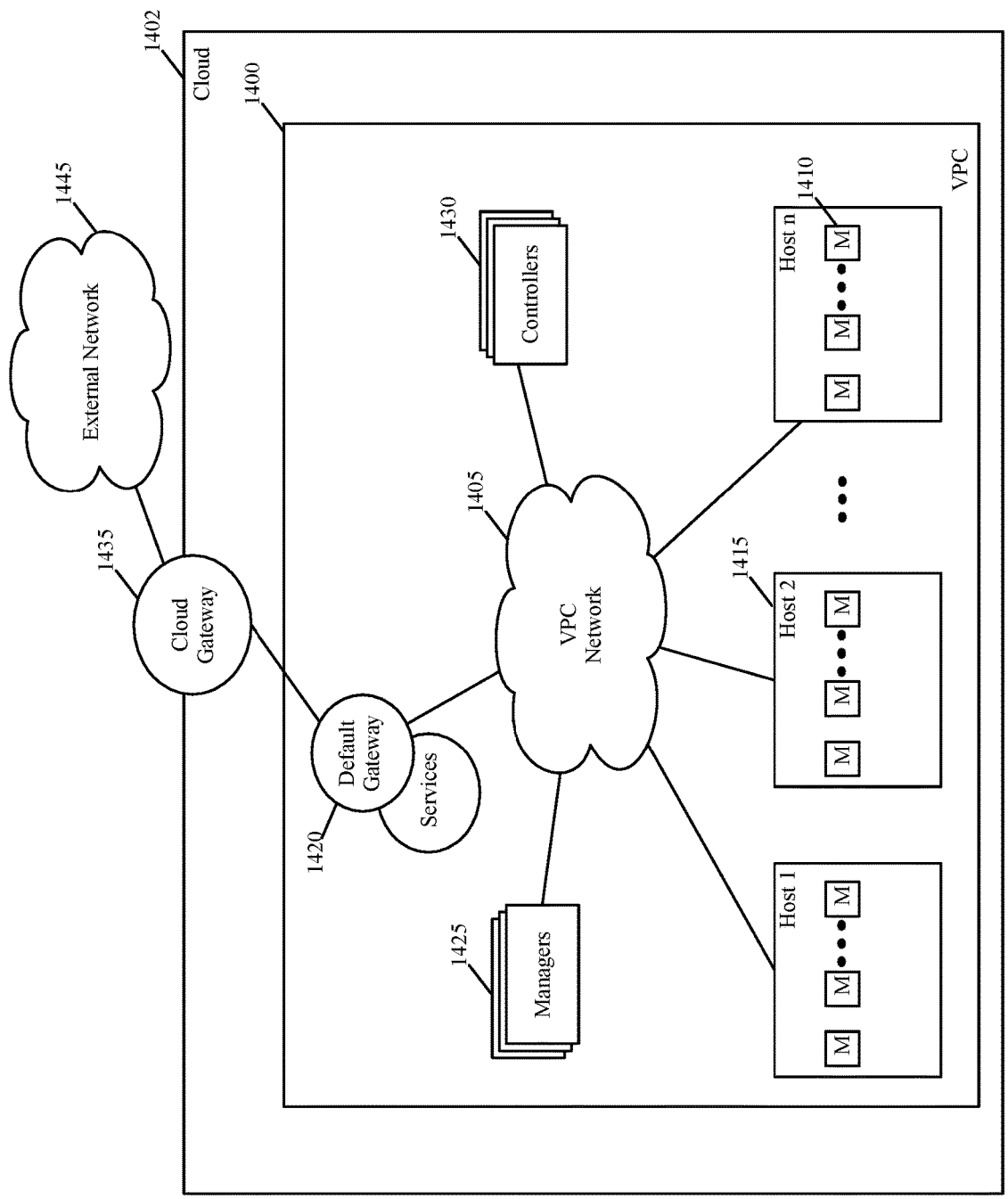
FIGS. 14-16 illustrate one example of deploying multiple edge gateways in an SDDC in order to allocate additional bandwidth to multiple different sets of ingress and egress flows to and from machines that are deployed in the SDDC for an entity.
Figure 15:
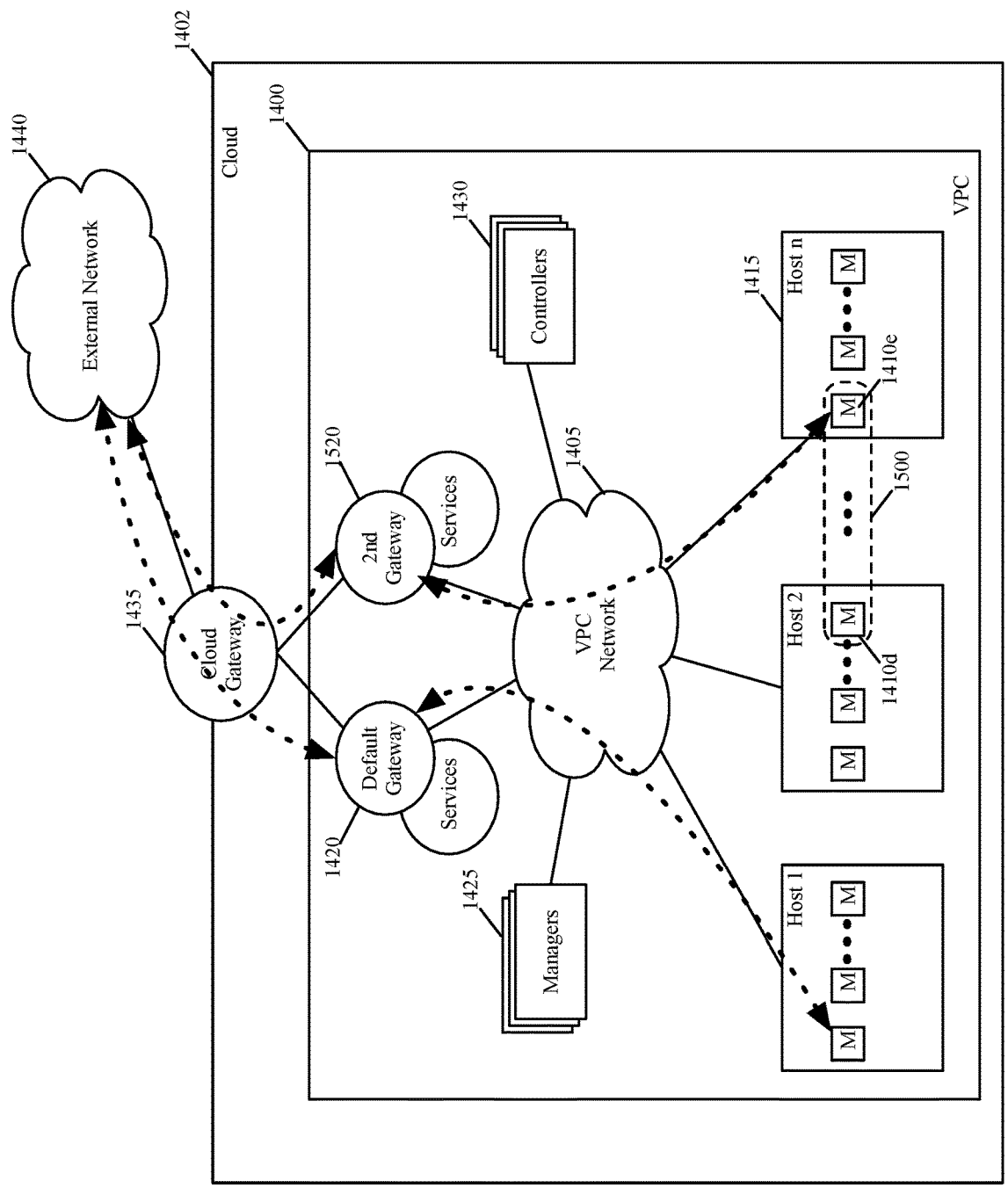
Figure 16:
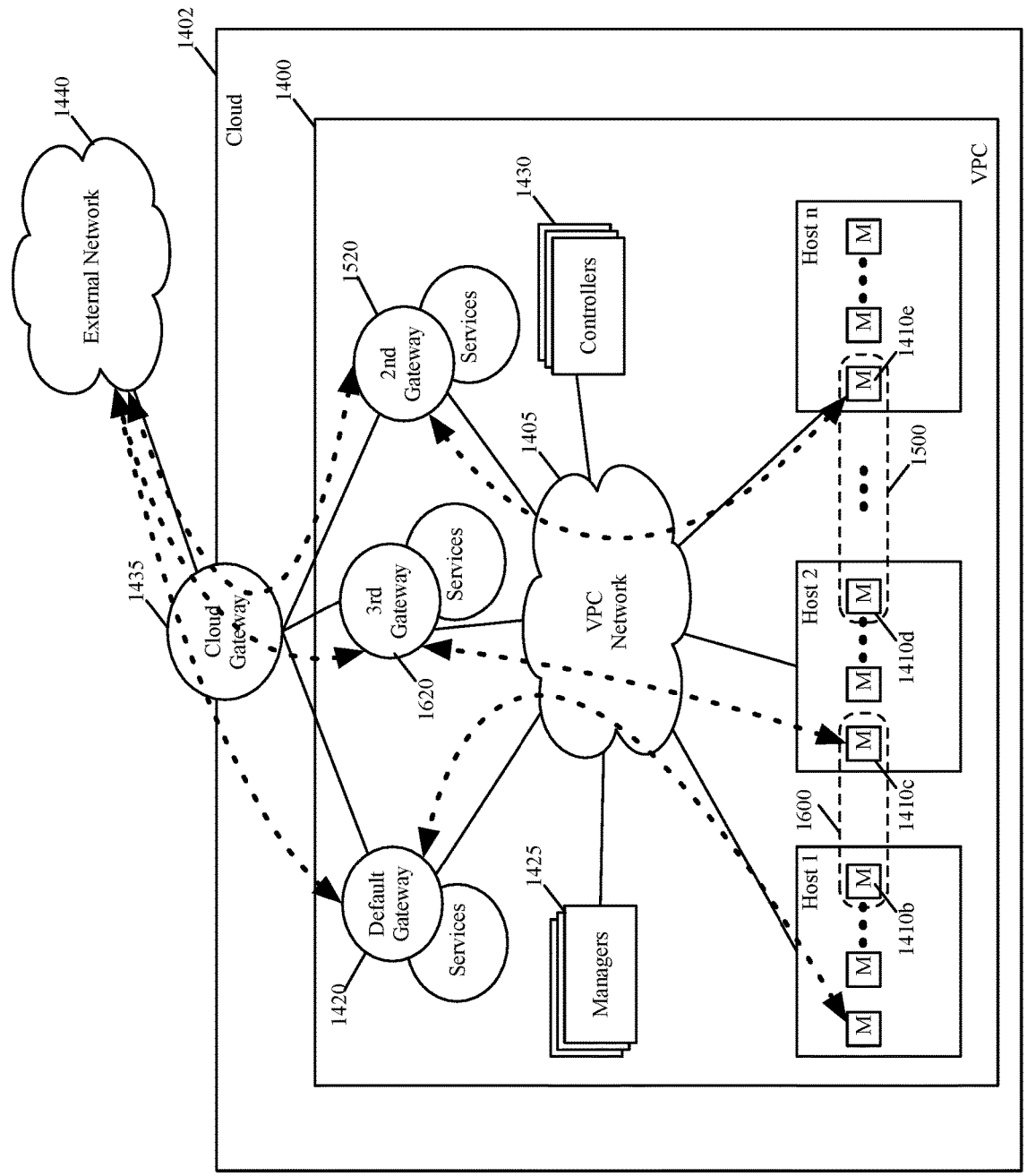

The gateways in some embodiments are edge gateways that connect the private first network of the entity to external networks (e.g., to the network of the SDDC or to external networks outside of the SDDC). FIGS. 14-16 illustrate one example of deploying multiple edge gateways in an SDDC in order to allocate additional bandwidth to multiple different sets of ingress and egress flows to and from machines that are deployed in the SDDC for an entity. In this example, the SDDC is a public cloud availability zone 1402 in which a VPC 1400 has been defined for an entity, which in this example is a tenant of the private cloud. An availability zone in some embodiments includes one datacenter or more than one datacenters that are near each other. Although FIGS. 14-16 illustrate the use of some embodiments in a public cloud context, one of ordinary skill will realize that some embodiments of the invention can similarly be implemented in private datacenters.

For the entity, the VPC 1400 includes a private network 1405 formed by several forwarding elements (e.g., switches and routers), which are not shown in these figures to avoid obscuring these figures with unnecessary detail. The forwarding elements include software forwarding elements (e.g., software switches and/or routers) and middlebox elements (e.g., firewall, load balancers, etc.) executing on multi-tenant host computers 1415 along with machines 1410 that have been deployed for the entity. In some embodiments, the forwarding elements also include hardware forwarding elements and/or middlebox elements (e.g., hardware switching and/or router appliances, and/or middlebox appliances).

In some embodiments, the private network 1405 is established by sharding the internal network address space of the private cloud, and providing a set of internal network addresses to the private network 1405 that does not overlap with the internal network addresses provided to any other tenant of the VPC. In other embodiments, the private network 1405 is a logical overlay network that is formed by establishing tunnels between the forwarding elements of the private network and having the forwarding elements exchange data messages through these tunnels, e.g., by encapsulating the data messages with tunnel headers that allow the data messages to be exchanged between the forwarding elements, while preserving the original data message headers that contain network addresses defined in the logical address space. In some embodiments, the logical address space of one tenant might overlap with the logical address space of another tenant but this does not matter because of the encapsulating tunnel headers.

FIG. 14 illustrates a default gateway 1420 that is initially deployed by a set of controllers 1430 to connect the VPC network 1405 with a first external network. The first external network in this example is a network inside of the public cloud datacenter 1402. In this example, any VPC gateway (including the default gateway 1420) connects to (i.e., forwards packets to) one or more gateways 1435 of the public cloud datacenter 1402, which communicates with an external network 1445 outside of the public cloud datacenter 1402. In other embodiments, a VPC gateway (including the default gateway 1420) connects directly to the external network 1445 without having to go through any gateway 1435 of the public cloud datacenter 1402.

In some embodiments, the controller set 1430 configures the default gateway 1420 to forward ingress data messages to the VPC network from the cloud gateway 1435, and egress data messages from the VPC network to the cloud gateway 1435. The controller set in some embodiments also configures the forwarding elements in the VPC network 1405 to forward the egress data message to the default gateway 1420, and the ingress data messages to the machines 1410 of the VPC network.

FIG. 15 illustrates the VPC 1400 after a gateway 1520 has been created for a first traffic group (TG). This traffic group includes a set of machines 1500, including machines 1410d and 1410e. The machine set 1500 in some embodiments includes a group of machines for the managers 1425 and/or controllers 1430 that are consuming more bandwidth and may, in the future, cause overloading of the default gateway 1420. While illustrated as individual gateways 1420 and 1520, the default gateway 1420 in some embodiments represents a default pair of T0 and T1 gateway, and the additional gateway 1520 represents an additional pair of T0 and T1 gateways.

For the first traffic group, the controller set 1430 deploys the first TG gateway 1520. In some embodiments, it is important for the same TG gateway to process ingress and egress data messages flow for the traffic group machines, as the gateway needs to maintain state and/or performs stateful middlebox services (such as firewall, load balancing, etc.) for the traffic group. In some embodiments, each gateway (e.g., the default gateway, and each TG gateway) maintains state and/or performs stateful middlebox services on ingress and/or egress traffic entering and/or exiting the VPC network.

In some of these embodiments, the controller set 1430 employs destination-side routing to ensure that the cloud gateway 1435 forwards all of the ingress data messages to the first traffic group (i.e., all the data messages that are destined to the list of network addresses provided for the first traffic group) to the TG gateway 1520, and source-side routing to ensure that the forwarding elements of the VPC network 1405 forward all the egress data messages from the first traffic group (i.e., all the egress data messages from the list of network addresses provided by the first traffic group) to the TG gateway 1520.

More specifically, the controller set 1430 configures the cloud gateway 1435 to forward to the first TG gateway 1520 ingress data messages that are destinated to the network address provided for the first traffic group. The controller set 1430 also configures the first TG gateway 1520 to forward these ingress data messages to the VPC network 1405 from the cloud gateway 1435, and egress data messages from the first TG machines 1500 to the cloud gateway 1435. In some embodiments, the controller servers also configure the first TG gateway 1520 to advertise routes to the list of TG-associated network addresses to the cloud gateway 1435.

The controller set 1430 in some embodiments also configures the forwarding elements in the VPC network 1405 to forward the egress data message with source addresses in the provided list of addresses of the first traffic group (i.e., all the egress data messages from the set of machines 1500 of the first traffic group) to the first TG gateway 1520. It also configures these forwarding elements to forward the ingress data messages that are destined to the TG-associated network addresses to the machine set 1500.

The forwarding elements in the VPC network 1405 in some embodiments include intervening routers. The controller set 1430 configures these intervening routers in the VPC network 1405 in some embodiments by providing next-hop forwarding rules to the set of intervening routers. Alternatively, or conjunctively, the configured set of forwarding elements in some embodiments includes a set of intervening switches that implement a logical switch. In these embodiments, the method configures the set of intervening switches by providing forwarding rules to the set of intervening switches to direct the switches to forward the first set of data message flows to the first TG gateway 1520 through tunnels that connect the set of intervening switches to the first TG gateway 1520.

FIG. 16 illustrates the VPC 1400 after a gateway 1620 has been created for a second traffic group (TG). This traffic group includes a set of machines 1600, including machines 1410b and 1410c. The machine set 1600 in some embodiments includes a group of machines for the managers 1425 and/or controllers 1430 that are consuming more bandwidth and may, in the future, cause overloading of the default gateway 1420, the first TG gateway 1520, or both. While illustrated as individual gateways 1420, 1520, and 1620, the default gateway 1420 in some embodiments represents a default pair of T0 and T1 gateway, the second gateway 1520 represents a first additional pair of T0 and T1 gateways, and the third gateway 1620 represents a second additional pair of T0 and T1 gateways.

For the second traffic group, the controller set 1430 deploys the second TG gateway 1620. As it did for the first traffic group, the controller set employs destination-side routing to ensure that the cloud gateway 1435 forwards all of the ingress data messages to the second traffic group (i.e., all the data messages that are destined to the list of network addresses provided for the second traffic group) to the second TG gateway 1620, and source-side routing to ensure that the forwarding elements of the VPC network 1405 forward all of the egress data messages from the second traffic group (i.e., all the egress data messages from the list of network addresses provided by the second traffic group) to the second TG gateway 1620.

The controller set 1430 also configures the second TG gateway 1620 to forward the ingress data messages to the VPC network 1405 from the cloud gateway 1435, and egress data messages from the second TG machines 1600 to the cloud gateway 1435. In some embodiments, the controller set also configures the second TG gateway 1620 to advertise routes to the network addresses associated with the second traffic group to the cloud gateway 1435. The controller set 1430 in some embodiments also configures the forwarding elements in the VPC network 1405 to forward ingress data messages that are destined to the second TG-associated network addresses to the machine set 1600.

After the controller set 1430 configures the first TG and second TG gateways 1520 and 1620, the first TG gateway 1520 forwards all of the ingress and egress traffic for the first traffic group machines, the second TG gateway 1620 forwards all of the ingress and egress traffic for the second traffic group machines, and the default gateway 1420 forwards all of the ingress and egress traffic for entity machines that are not in the first and second traffic groups.

In some embodiments, each gateway 1420, 1520 or 1620 is a logical gateway that is implemented by a high-availability (HA) pair of physical gateways, which are in an HA active-standby configuration, as further described below. Also, each gateway is deployed as a separate appliance in some embodiments. In other embodiments, each gateway is deployed as a machine that executes on a host computer (e.g., a multi-tenant host computer or a standalone host computer). In some of these embodiments, the different gateways are deployed on different host computers in order to maximize the throughput of each gateway. Using different host computers to implement different gateways for different traffic groups allows dedicated resources (e.g., physical network interface cards (PNICs)) of the different host computers to be used for the data message flows of the different traffic groups.

While the embodiments described above relate to deploying an additional gateway for a group of machines consuming more bandwidth of a default gateway than other machines, some embodiments deploy a pair of gateways for each group of machines. Specifically, a default gateway is a default pair of gateways, and as new gateways are deployed, a new pair of gateways is deployed for each machine group.

In some embodiments, a single traffic group is associated with two or more gateways. In such embodiments, data message flows sent from the machines in the traffic group are sent through the two or more gateways. In some of these embodiments, different subsets of machines of the traffic group are assigned to different gateways, such that data message flows sent by each machine are sent through only one of the gateways. In other embodiments, at least one machine of the traffic group is assigned to two gateways, such that different sets of data message flows sent by the machine are sent through different gateways. Still, in other embodiments, data messages of at least one flow are sent through different gateways, such that different sets of data messages of the flow are sent through different gateways.

In some embodiments, a multi-edge workflow uses an API that refers to traffic groups and a map identifier to associate a set of segments to a newly created set of gateways. A traffic group identifier in some embodiments represents the newly created active edge identifier. To find a set of segments, an algorithm may be used to find the machines that consume more bandwidth of a gateway uplink interface and find the logical segments with which the machines are associated. Once a prefix list for the identified segments has been created, it can be associated to a new pair of gateways using an API. This API in some embodiments includes a map identifier and the list of prefixes of the identified segments.

Automatically monitoring bandwidth and scaling gateways in a system provides many advantages. For instance, the methods described above provide (1) a proactive calculation of bandwidth usage of a gateway uplink and of machines, (2) an effective algorithm that predicts a set of segments that require new gateways, (3) a segment group module that groups segments into low bandwidth and high bandwidth consumption segment groups, (4) an effective algorithm that places the low bandwidth segment group(s) onto a default gateway and the high bandwidth segment group(s) onto new gateways, (5) a routing group module that finds a routing group within each segment group rather than putting all segments onto the gateway pairs, (6) automatic creation of the required objects in the system to trigger a scale out workflow, and (7) automatic scale out and scale in operations based on the bandwidth monitor to ensure that resources in the system are properly used.

Figure 17:
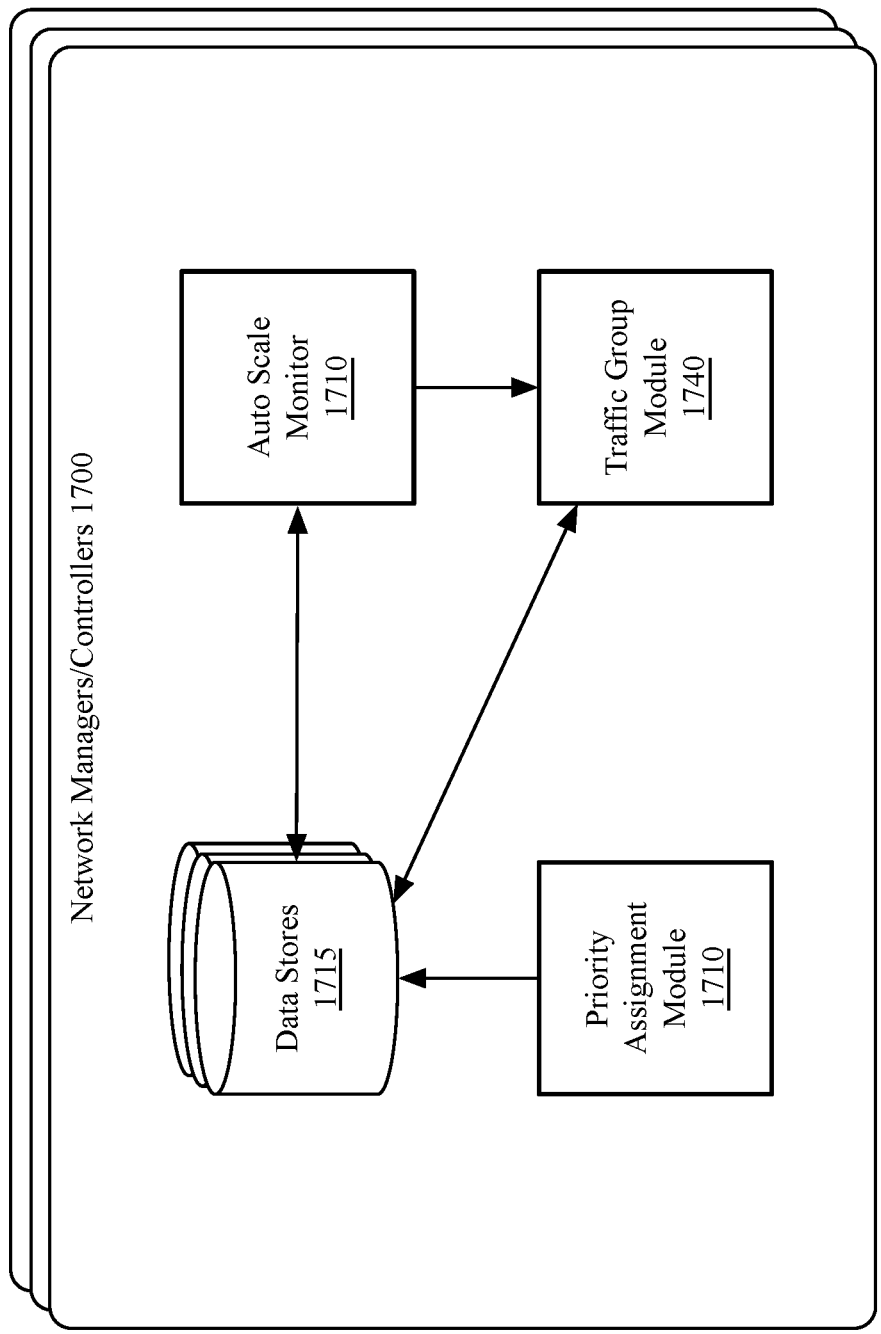
FIG. 17 illustrates a manager and controller set of a network that dynamically assigns machines to traffic groups based on priority of the machines and based on predicted future load on gateways used by the machines.

As discussed previously, traffic groups are created in some embodiments for using different gateways to connect to one or more external networks. In some embodiments, machines are reassigned to traffic groups based on bandwidth usage of the machines, load on the gateways, and/or priority of the machines. FIG. 17 illustrates a manager and controller set 1700 of a network that dynamically adds and removes machines from traffic groups based on (1) monitored bandwidth usage of the gateways and the machines that exchange data messages with one or more external networks through the gateways, and (2) priority levels assigned to the machines. In some embodiments, the network is a datacenter, such as an SDDC. The manager and controller set 1700 is in some embodiments a cluster of servers and can include any number of managers and controllers. Each component of the manager and controller set 1700 described below may operate on the same manager or controller, or may operate in a distributed fashion across the managers and controllers.

The manager and controller set 1700 of some embodiments includes an auto scale monitor 1710. The auto scale monitor 1710 is an application, program, and/or module that is responsible for monitoring bandwidth usage of one or more gateways using bandwidth usage statistics stored in a set of data stores 1715. The auto scale monitor 1710 of some embodiments monitors each gateway's Internet, Intranet, and VPC bandwidth usage statistics. The auto scale monitor 1710 may also predict at which time each gateway's bandwidth usage will exceed a specified threshold. In some embodiments, the network already has multiple deployed gateways, with each gateway associated with at least one traffic group. In such embodiments, the auto scale monitor 1710 monitors all of the gateways in order to determine when to add machines to or remove machines from the different traffic groups. The auto scale monitor 1710 in some embodiments performs operations similar to the auto scale monitor 710 of FIG. 7 to determine when to modify traffic groups. For instance, the auto scale monitor 1710 uses a prediction algorithm (e.g., a machine learning algorithm) to predict the future throughput (and/or bandwidth usage) of one or more gateways' Intranet, Internet, and/or VPC uplink interfaces. In some embodiments, this value is calculated using data collected for the last 30 minutes at one-minute intervals.

After determining that future bandwidth usage of a gateway used by a particular traffic group will exceed a threshold, the auto scale monitor 17710 in some embodiments notifies a traffic group module 1740 in order for the traffic group module 1740 to reassign at least a subset of machines of the particular traffic group to another traffic group that uses a different gateway. In some embodiments, the traffic group module 1740 identifies the subset of machines to reassign based on the priority of the machines in the particular traffic group. In some of these embodiments, the traffic group module 1730 identifies any subset of machines to reassign. In other embodiments, a user provides, to a priority assignment module 1740, a specification of machines in the network that are high priority machines in order for the traffic group module 1730 to reassign high priority machines from gateways that have a high predicted future load.

After receiving this specification, the priority assignment module 1740 stores the specification in the set of data stores 1715. In some embodiments, bandwidth statistics and priority assignments are stored in a same data store. In other embodiments, bandwidth statistics and priority assignments are stored in different data stores. The traffic group module 1740 in some embodiments retrieves the specification of high priority machines from the data store set 1715. In other embodiments, the traffic group module 1740 queries this information from the priority assignment module 1740, and the priority assignment module 1740 provides it directly to the traffic group module 1730.

After identifying which machines in the particular traffic group are a high priority, the traffic group module 1730 determines at least one additional gateway that has available bandwidth to forward flows for the identified machines. After identifying at least one additional gateway, the traffic group module 1730 reassigns the high priority machines to one or more traffic groups associated with the at least one additional gateways. As a result, the particular traffic group does not include the high priority machines anymore and load of the gateway associated with the particular traffic group is reduced.

Figure 18:
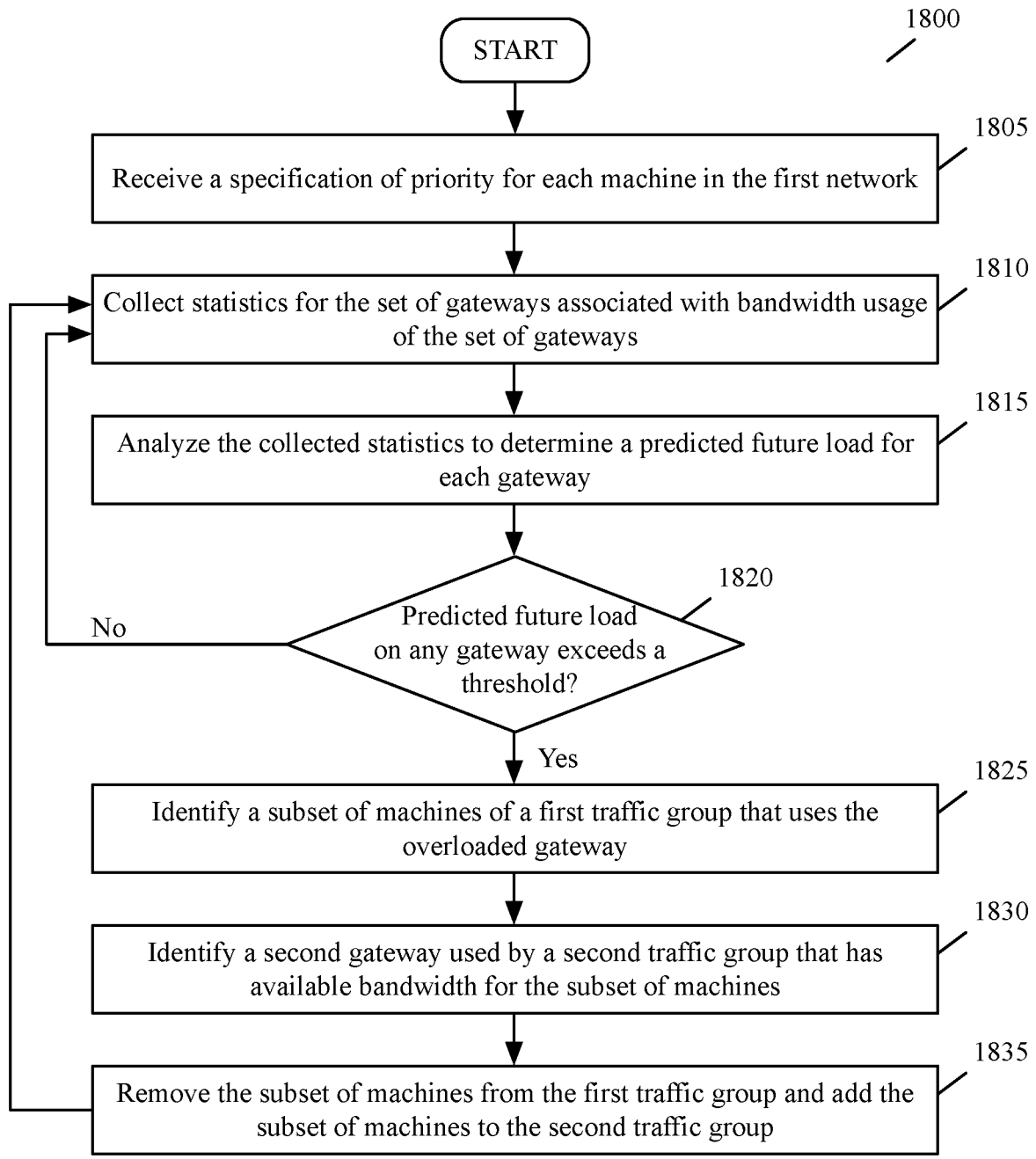
FIG. 18 conceptually illustrates a process of some embodiments for associating machines of a first network with a set of gateways that connect the machines to a particular external network through the set of gateways.

FIG. 18 conceptually illustrates a process 1800 of some embodiments for associating machines of a first network with a set of gateways that connect the machines to a particular external network through the set of gateways. In some embodiments, the process 1800 is performed by a set of one or more managers and controllers of a first network that includes the machines. The first network is in some embodiments an SDDC or a cloud datacenter, such as the cloud datacenter 100. The particular external network is in some embodiments an on-premises datacenter, such as the on-premises datacenter 120.

The process 1800 begins by receiving (at 1805) a specification of priority for each machine in the first network. The manager and controller set in some embodiments (i.e., a priority assignment module of the manager and controller set) receives, from a user or network administrator, a specification of priority for each of the machines in the first network. In some embodiments, the specification is a list of machines the user designates as high priority machines. In other embodiments, the specification is a list of all machines, with a designation as a high priority machine or a low priority machine for each machine. By specifying which machines are of a higher priority than others, the user specifies to the manager and controller set which data message flows are more critical than others.

Next, the process 1800 collects (at 1810) statistics for the set of gateways associated with bandwidth usage of the set of gateways. In some embodiments, each gateway in the first network includes an Intranet interface, Internet interface, and VPC interface. The manager and controller set in some embodiments (i.e., an auto scale monitor of the manager and controller set) collects statistics related to the bandwidth usage of at least one of these interfaces of the gateways. For example, the collected statistics in some embodiments specify bandwidth use of the Intranet uplink interfaces of the gateways by the machines, as these interfaces connect the first network to the particular external network. In some embodiments, the statistics specify bandwidth use of the gateways by the set machines of the first network at different times. In such embodiments, each statistic in the specifies the amount of bandwidth of a gateway being used by the machines at a particular time, such that the collected statistics represents time-series bandwidth usage statistics of each of the gateways.

In some embodiments, the statistics are retrieved by the manager and controller set from a data store. Before retrieving the statistics from the data store, some embodiments iteratively collect subsets of statistics for the gateways at specified time intervals, and store the collected subsets of statistics in the data store. Each subset of statistics may specify the amount bandwidth of the gateways being used at a particular time. For example, the percentage of bandwidth being used on the gateways may be collected every minute, so each subset of statistics specifies the percentage of bandwidth use at the particular time the statistic was collected. The collected statistics includes in some embodiments different subsets of statistics. The data store of some embodiments is a time-series database. In some embodiments, the manager and controller set also collects metrics related to the machines of the first network, such as throughput values that can be used to determine bandwidth utilization of each machine. The collection of statistics at step 1810 is in some embodiments similar to the process 600 of FIG. 6.

At 1815, the process 1800 analyzes the collected statistics to determine a predicted future load for each gateway. Using the statistics collected for each gateway, the manager and controller set (i.e., the auto scale monitor) uses a prediction algorithm to predict the future load on each of the gateways in the first network. The algorithm, which may be similar to the algorithm 720 of FIG. 7, is a time-series algorithm in some embodiments that uses historical series data in order to predict future values of the series. Using past bandwidth usage statistics for each gateway, the algorithm predicts future bandwidth usage statistics of the each gateway, thereby predicting the utilization percentage of the gateways (i.e., the gateways' Intranet, Internet, and/or VPC uplink interfaces) by the machines that use the gateways. For instance, using statistics related to a particular gateway used by a particular traffic group of a particular set of machines, the manager and controller set can predict the bandwidth utilization of the particular gateway by the particular traffic group. In some embodiments, the predicted future load for a particular gateway predicts the bandwidth usage percentage of the particular gateway for each minute of the next 30 minutes.

When the network manager and controller set uses bandwidth usage statistics for only one uplink interface of each gateway (e.g., only the Intranet uplink interfaces), the manager and controller set determines predicted bandwidth usage statistics for only that uplink interface type for the gateways. When the manager and controller set uses bandwidth usage statistics for multiple uplink interfaces of the gateways (e.g., the Intranet, Internet, and VPC uplink interfaces), the manager and controller set may determine a different set of predicted future bandwidth usage statistics for the different uplink interfaces for each gateway. Alternatively or conjunctively, the manager and controller set in some embodiments receives a set of future bandwidth statistics that combines the usage of the multiple uplink interfaces for each gateway.

After determining the predicted future load for each gateway in the first network, the process 1800 determines (at 1820) whether the predicted future load on any gateway in the first network exceeds a particular threshold. In some embodiments, the manager and controller set (i.e., the auto scale monitor) determines whether the predicted future loads for the gateways exceed a threshold percentage specified by a network administrator or user. For example, the particular threshold is 80% in some embodiments.

If the process 1800 determines that none of the predicted future loads on the gateways in the first network exceed the particular threshold, the process 1800 returns to step 1810 to continue collecting statistics for the set of gateways. If the process 1800 determines that the predicted future load on at least one gateway in the first network exceeds the particular threshold, the process 1800 proceeds to steps 1825-1835 for each gateway whose predicted future load exceeds the particular threshold.

At 1825, the process 1800 identifies a subset of machines of a first traffic group, that includes a first set of machines, that uses the overloaded gateway. In some embodiments, each gateway in the first network is associated with one traffic group. After identifying the overloaded gateway, the auto scale monitor of the manager and controller set notifies the traffic group module to identify machines in the first traffic group to reassign to a different traffic group that uses a different gateway to connect to the particular external network. The traffic group module in some embodiments identifies machines in the first traffic group that are associated with a high priority level, such that each machine in the identified subset is a high priority machine. By identifying high priority machines and reassigning them to a different traffic group that uses a non-overloaded gateway, the traffic group module ensures that the data message flows associated with the high priority machines are not dropped.

In some embodiments, the traffic group module identifies the high priority machines in the first traffic group by retrieving the high priority machine specification list stored in the data store of the manager and controller set. In other embodiments, the traffic group module requests the list of high priority machines of the first traffic group from the priority assignment module. In such embodiments, the priority assignment module receives (e.g., in an API) a request from the traffic group module, which includes a list of machines in the first traffic group and a request to identify the high priority machines of the machines in the first traffic group. The priority assignment module retrieves the high priority machine specification list from the data store, and identifies the priority level of each machine in the first traffic group. Then, the priority assignment module provides, in a response message (e.g., an API response) to the traffic group module specifying the high priority machines that are members of the first traffic group.

After identifying the subset of machines, the process 1800 identifies (at 1830) a second gateway used by a second traffic group of a second set of machines that has available bandwidth for the subset of machines. In some embodiments, the traffic group module retrieves, from the data store of the manager and controller set, bandwidth usage statistics and throughput value metrics related to the machines of the first network to determine the bandwidth utilization of each traffic group. Based on the determined bandwidth utilization of each traffic group, the traffic group module is able to determine which traffic group has enough available bandwidth to include the subset of machines as members such that the second gateway will not exceed the particular threshold in the future. In some embodiments, the traffic group module determines the available bandwidth for each traffic group by subtracting the bandwidth utilization from the total bandwidth allotted to the traffic group (i.e., from the total bandwidth provisioned for the associated gateway).

In some embodiments, only one traffic group has enough available bandwidth to include the subset of machines as members. In such embodiments, the traffic group module selects this traffic group as the traffic group to reassign the subset of machines. In other embodiments, multiple other traffic groups have enough available bandwidth to include the subset of machines as members. In some of these embodiments, the traffic group module selects the traffic group with the most available bandwidth as the traffic group to reassign the subset of machines. In other embodiments where multiple traffic groups have enough available bandwidth, the traffic group module selects a traffic group deterministically or non-deterministically, or performs a load balancing operation to select the traffic group to reassign the subset of machines.

After determining the second gateway used by the second traffic group that has available bandwidth, the process 1800 removes (at 1835) the subset of machines from the first traffic group and adds the subset of machines to the second traffic group in order to reduce load on the overloaded gateway. In some embodiments, the traffic group module of the manager and controller set generates a set of routing records and distributes the routing records to one or more routers in the first network. These routing records specify that data message flows sent by the subset of machines are to be sent to the particular external network through the second gateway, thereby including the subset of machines in the second traffic group. These routing records also specify in some embodiments that data message flows sent by machines that are in the first traffic group but are not in the identified subset of machines are to be sent to the particular external network through the overloaded gateway. By not including the subset of machines in this specification in the routing records, the traffic group module removes the subset of machines from the first traffic group.

After adding the subset of machines to the second traffic group, the process 1800 returns to step 1810 to continue collecting statistics for the gateways and analyzing the statistics to monitor the gateways in the first network. In some embodiments, the process 1800 is performed iteratively (as shown). In other embodiments, the process 1800 is performed a specified number of times and then ends. The specified number of times is specified in some embodiments by a network administrator. Still, in other embodiments, the process 1800 is performed only once, and then ends.

Figure 19A:
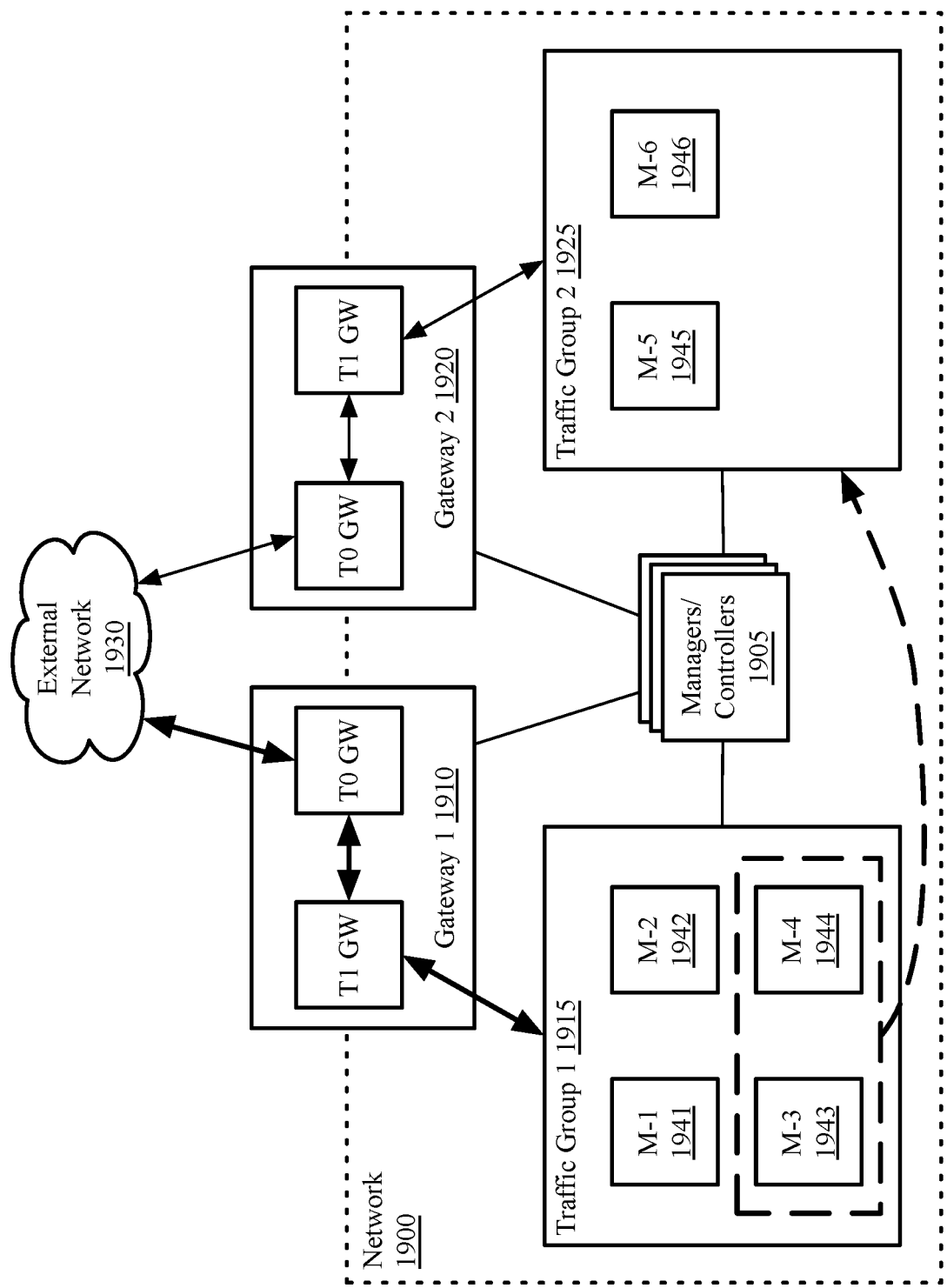
FIGS. 19A-B illustrate an example network at a first stage when a first gateway is overloaded and a second stage after a set of managers and controllers alleviates the load on the first gateway.
Figure 19B:
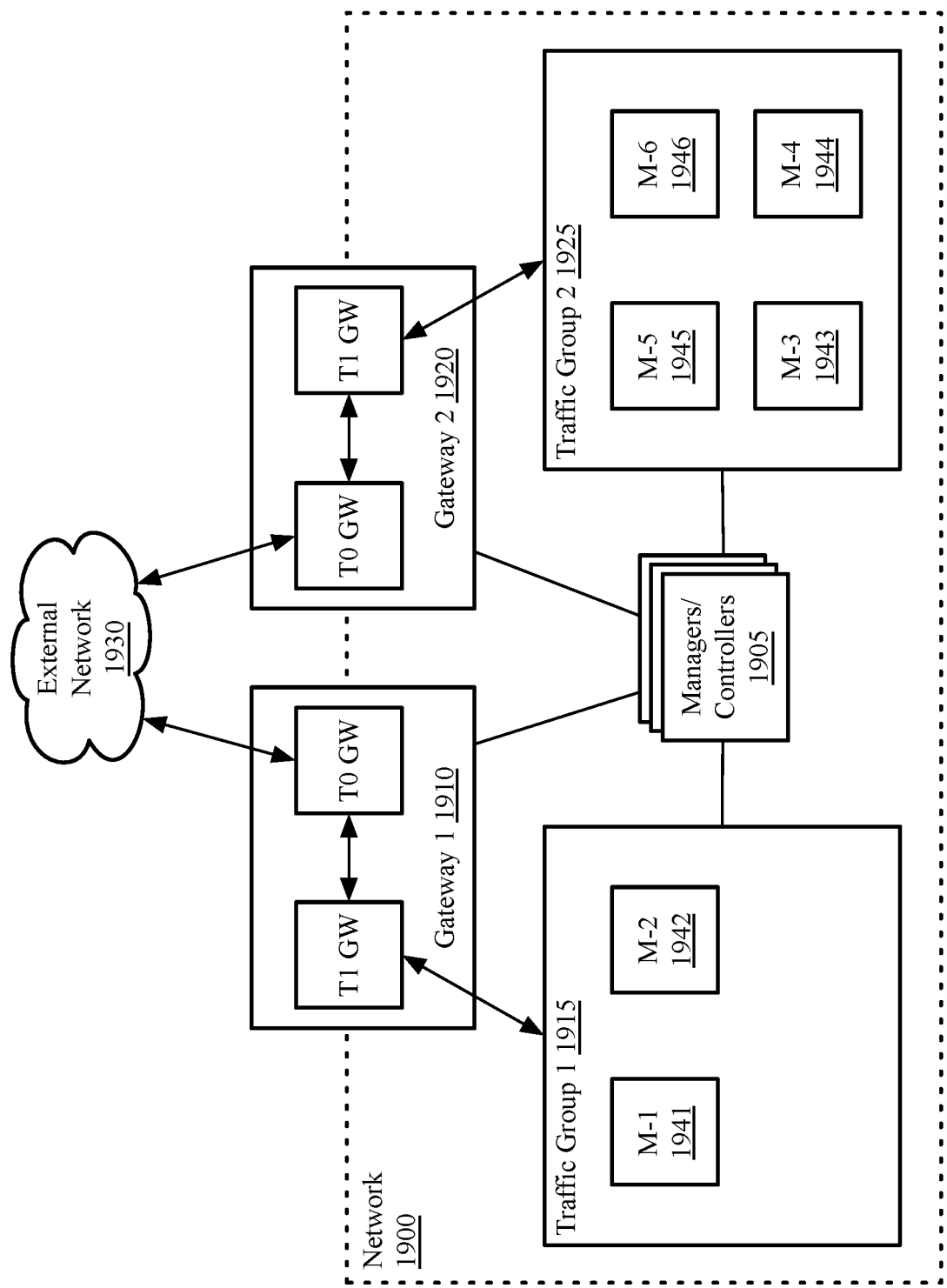

FIGS. 19A-B illustrate an example network 1900 that is managed by a set of managers and controllers 1905 and that uses two gateways 1910 and 1920 to connect to an external network 1930. As shown, each gateway 1910 and 1920 is a pair of T0 and T1 gateways. In this example, the network 1900 includes two traffic groups 1915 and 1925. The first traffic group 1915 includes a first set of machines 1941-1944, and the second traffic group 1925 includes a second set of machines 1945-1946. While two traffic groups are drawn with respectively four and two machines included, one of ordinary skill in the art would understand that a network, such as the network 1900, can include any number of traffic groups that have any number of machines as members.

The first traffic group 1915 is associated with the first gateway 1910, meaning that the machines that are members of the first traffic group 1915 use the first gateway 1910 to communicate with the external network. The second traffic group 1925 is associated with the second gateway 1920, meaning that the machines that are members of the second traffic group 1925 use the second gateway 1920 to communicate with the external network.

All of the machines 1941-1946 and the gateways 1910 and 1920 are managed and controlled by the manager and controller set 1905. In some embodiments, the manager set 1905 dynamically reassigns machines between the different traffic groups 1915 and 1925 based on the load on the gateways 1910 and 1920 by the different traffic groups.

FIG. 19A illustrates the network 1900 when the manager and controller set 1905 determined that a predicted future load on the first gateway 1910 exceeds a particular threshold (as denoted by bolded arrows). The particular threshold is defined in some embodiments for the manager and controller set 1905 in order for the manager and controller set 1905 to determine when to alleviate load on the gateways 1910 and 1920. The manager and controller set 1905 uses bandwidth usage statistics related to the first gateway 1910 to determine that the load on the first gateway 1910 will exceed the particular threshold in the future.

In this figure, machines 1941-1944 are members of the first traffic group 1915, and use the first gateway 1910 to communicate with the external network 1930. After determining that the predicted future load on the first gateway 1910 exceeds the particular threshold, the manager and controller set identifies a subset of the machines 1941-1944 to reassign to the second traffic group 1925 in order to alleviate load on the first gateway 1910. Using priority levels assigned to the machines 1941-1944 (e.g., assigned to the machines by a network administrator), the manager and controller set 1905 identifies the machines 1943 and 1944 as high-priority machines and identifies them as the machines to reassign to the second traffic group 1925. In some embodiments, the manager and controller set 1905 identifies all high priority machines to move all high priority machines to the second traffic group 1925. In other embodiments, the manager and controller set 1905 identifies some of the high priority machines to move only a subset of them to the second traffic group 1925.

FIG. 19B illustrates the network 1900 after the manager and controller set 1905 reassigns the machines 1943-1944 to the second traffic group. After the reassignment, the first traffic group 1915 includes only the machines 1941-1942, and these machines are the only machines that use the first gateway 1910 to communicate with the external network 1930. Because less machines use the first gateway 1910, the first gateway 1910 has a lesser load, thereby avoiding data message flow dropping at the first gateway 1910 that could have occurred had the first gateway 1910 exceeded its allotted load. The second traffic group 1925 now includes the machines 1945-1946 (as it did initially) and the reassigned machines 1943-1944. Now, these four machines 1943-1946 use the second gateway 1920 to communicate with the external network 1930.

Before reassigning the identified subset of machines 1943-1944 to the second traffic group 1925, the manager and controller set in some embodiments first determines that the second gateway 1920 is able to handle the load of the subset of machines 1943-1944 along with the machines 1945-1946 already in the second traffic group. Using bandwidth usage statistics associated with the second gateway 1920 and throughput value metrics associated with the machines 1943-1946, the manager and controller set 1905 in some embodiments determines whether the predicted future load on the second gateway 1920 has enough available bandwidth for the bandwidth utilization of the machines 1943-1946.

If the second gateway 1920 has the available bandwidth, the manager and controller set 1905 reassigns the machines 1943-1944 to the second traffic group. If the second gateway 1920 does not have the available bandwidth, the manager and controller set 1905 in some embodiments deploys a third gateway in the network 1900, creates a third traffic group that will use the third gateway to connect to the external network 1930, and reassigns the machines 1943-1944 to the third traffic group. Alternatively, the manager controller set 1905 in some embodiments reassigns only a subset of the machines 1943-1944 to the second traffic group 1925, and keeps the remaining machines as members of the first traffic group 1915.

Figure 20:
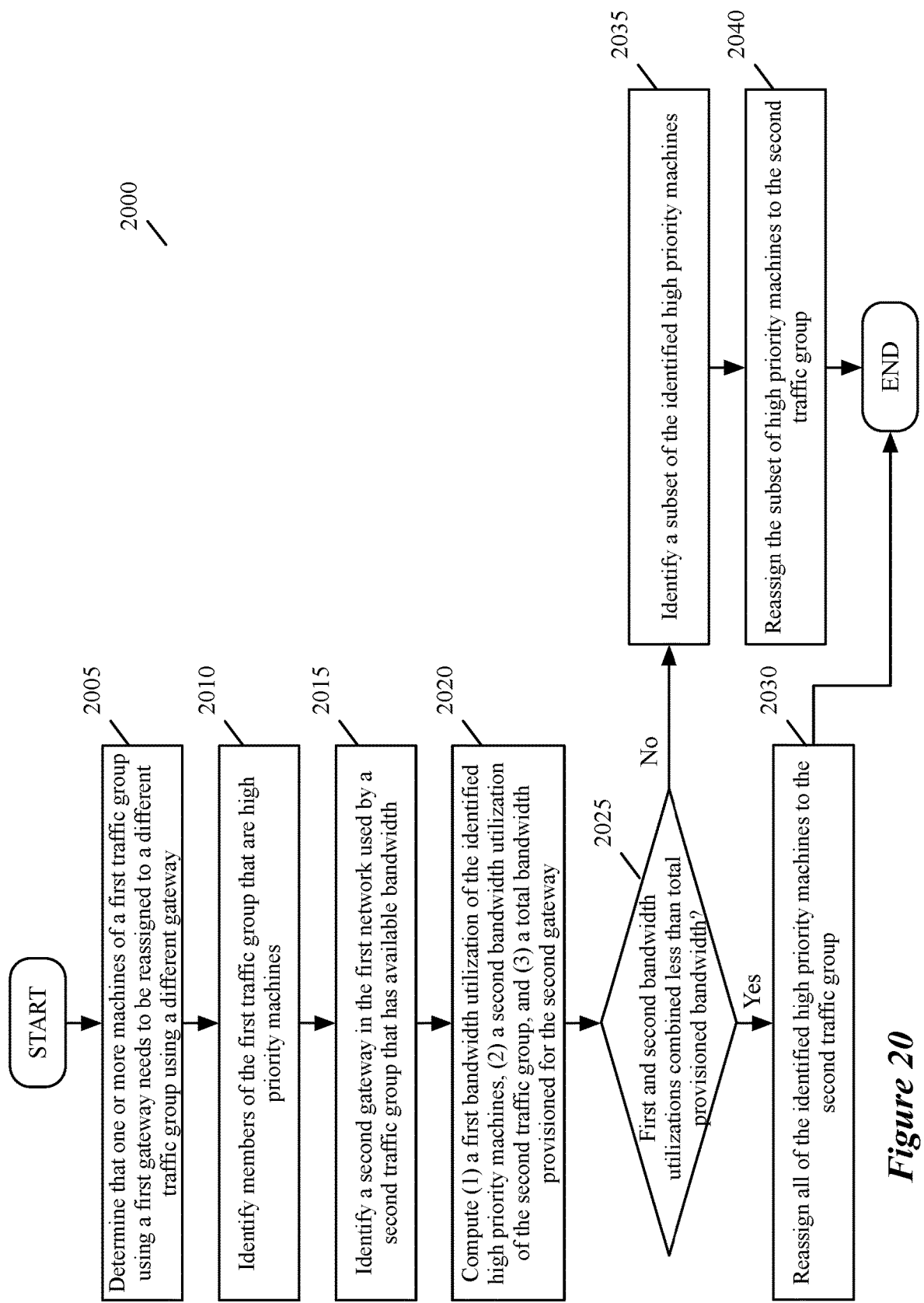
FIG. 20 conceptually illustrates a process of some embodiments for efficiently reassigning machines to traffic groups of a first network that communicate with a particular external network using a set of gateways.

FIG. 20 conceptually illustrates a process 2000 of some embodiments for efficiently reassigning machines between traffic groups of a first network that communicate with a particular external network using a set of gateways. The process 2000 is performed in some embodiments by a set of managers and controllers of the first network, more specifically by a traffic group module of the manager and controller set (such as the traffic group module 1740 of FIG. 17). In some embodiments, the first network includes multiple traffic groups, each including a different set of machines as members. Each traffic group is associated with a different gateway in the first network to connect to the particular external network.

The process 2000 begins by determining (at 2005) that one or more machines of a first traffic group using a first gateway needs to be reassigned to a different traffic group using a different gateway in the first network. In some embodiments, the traffic group module determines that a predicted future load on the first gateway exceeds a particular threshold, which causes the traffic group module to determine that some of the traffic sent through the first gateway should be reassigned to another gateway in the first network. The traffic group module predicted the future load on the first gateway in some embodiments using bandwidth usage statistics collected for the first gateway and throughput value metrics collected for the members of the traffic group.

Next, the process 2000 identifies (at 2010) members of the first traffic group that are high priority machines. In some embodiments, a user or network administrator specifies priority levels for the machines in the first network (e.g., low priority, high priority, etc.). The traffic group module in some embodiments retrieves a user-specified list of high priority machines in the first network from a set of one or more data stores of the manager and controller set. In other embodiments, the traffic group module requests (e.g., in an API) the user-specified list of high priority machines in the first network from a priority assignment module of the manager and controller set. After retrieving the list of high priority machines, the traffic group module determines which of the machines in the first traffic group are high priority machines. In some embodiments, the user-specified list includes an identifier (e.g., a universally unique identifier (UUID)), for each machine and a specification of the machine's assigned priority level (e.g., low, high, etc.).

At 2015, the process 2000 identifies a second gateway in the first network used by a second traffic group that has available bandwidth. In some embodiments, the traffic group module retrieves, from the set of data stores of the manager and controller set, bandwidth usage statistics and throughput value metrics related to the machines of the first network to determine the bandwidth utilization of each traffic group in the first network. Based on the determined bandwidth utilization of each traffic group, the traffic group module is able to determine which traffic group has available bandwidth to include one or more machines not already in the associated traffic group such that the second gateway will not exceed the particular threshold in the future. In some embodiments, the traffic group module determines the available bandwidth for each traffic group by subtracting the bandwidth utilization from the total bandwidth allotted to the traffic group (i.e., from the total bandwidth of the associated gateway).

In some embodiments, only one traffic group any available bandwidth. In such embodiments, the traffic group module selects this gateway as the second gateway. In other embodiments, multiple other traffic groups have available bandwidth. In some of these embodiments, the traffic group module selects the gateway associated with the traffic group with the most available bandwidth as the second gateway. In other embodiments where multiple traffic groups have available bandwidth, the traffic group module selects a traffic group deterministically or non-deterministically, or performs a load balancing operation to select the second gateway and the second traffic group.

After identifying the second gateway, the process 2000 computes (1) a first bandwidth utilization of the identified high priority machines, (2) a second bandwidth utilization of the second traffic group, and (3) a total bandwidth provisioned for the second gateway. Using the throughput value metrics and the bandwidth usage statistics, the traffic group module computes the amount of bandwidth used by the identified high priority machines, the amount of bandwidth used by the members of the second traffic group, and the total bandwidth that is provisioned for the second gateway (i.e., the total amount of bandwidth the second gateway can handle before exceeding the threshold determined for gateways in the first network). Using these values, the traffic group module is able to determine whether the second gateway can handle the traffic load of both the current members of the second traffic group and the high priority machines of the first traffic group.

At 2025, the process 2000 determines whether the first and second bandwidth utilizations combined is less than the total provisioned bandwidth for the second gateway. The traffic module combines the first and second bandwidth utilizations to determine the amount of bandwidth that would be used by the current members of the second traffic group and the high priority machines of the first traffic group if they were all members of a single traffic group. Then, the traffic group module compares this value to the total bandwidth that is provisioned for the second gateway. In some embodiments, the traffic group module determines whether the first and second bandwidth utilizations combined exceed the particular threshold. In such embodiments, this determines whether a predicted future load on the second gateway would exceed the particular threshold if both the second set of machines and the identified high priority machines were to use the second gateway. In some embodiments, the particular threshold is less than the total provisioned bandwidth of the second gateway. Alternatively, the particular threshold is equal to the total provisioned bandwidth of the second gateway in some embodiments.

If the process 2000 determines that the first and second bandwidth utilizations combined are less than the total provisioned bandwidth for the second gateway, the process 2000 reassigns (at 2030) all of the identified high priority machines from the first traffic group to the second traffic group. In some embodiments, the traffic group module generates a set of routing records and distributes the routing records to one or more routers in the first network. These routing records specify that data message flows sent by the identified high priority machines are to be sent to the particular external network through the second gateway, thereby including the these high priority machines in the second traffic group. These routing records also specify in some embodiments that data message flows sent by machines that are in the first traffic group but are not in the identified high priority machines are to be sent to the particular external network through the first gateway. By not including the high priority machines in this specification in the routing records, the traffic group module reassigns the high priority machines from the first traffic group to the second traffic group. After reassigning the high priority machines to the second traffic group, the process 2000 ends.

If the process 2000 determines that the first and second bandwidth utilizations combined are not less than the total provisioned bandwidth for the second gateway, the process 2000 identifies (at 2035) a subset of the identified high priority machines. After determining that the second gateway cannot handle the load of all the identified high priority machines along with the current members of the second traffic group, the traffic group module identifies some of the high priority machines to reassign them to the second traffic group. In some embodiments, the traffic group module identifies the highest bandwidth-consuming machines of the high priority machines to include in the subset of high priority machines. In such embodiments, highest bandwidth-consuming machines are determined based on a threshold amount of bandwidth (which is specified by a user or network administrator, in some embodiments).

Alternatively or conjunctively, the traffic group module identifies the highest bandwidth-consuming machines by identifying a particular number of machines that consume more bandwidth than the other high priority machines. For example, the traffic module in some embodiments orders the high priority machines according to their bandwidth consumption, and selects the top half of these machines as the subset of high priority machines to reassign. In some embodiments, after identifying the subset of high priority machines, the traffic group module computes a bandwidth utilization for the subset of high priority machines and determines that this bandwidth utilization combined with the second bandwidth utilization is less than the total provisioned bandwidth for the second gateway.

After identifying the subset of high priority machines, the process 2000 reassigns (at 2040) the subset of high priority machines from the first traffic group to the second traffic group. Similarly to step 2030, the traffic group module in some embodiments generates a set of routing records and distributes the routing records to one or more routers in the first network. These routing records specify that data message flows sent by the subset of high priority machines are to be sent to the particular external network through the second gateway, thereby including the subset of high priority machines in the second traffic group. The traffic group module does not reassign high priority machines that are not in the identified subset to the second traffic group, thereby keeping them as members of the first traffic group. By reassigning a subset of high priority machines to the second traffic group, the load on the first gateway is alleviated. After reassigning the subset of high priority machines to the second traffic group, the process 2000 ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 21 conceptually illustrates a computer system 2100 with which some embodiments of the invention are implemented. The computer system 2100 can be used to implement any of the above-described computers and servers. As such, it can be used to execute any of the above described processes. This computer system includes various types of non-transitory machine readable media and interfaces for various other types of machine readable media. Computer system 2100 includes a bus 2105, processing unit(s) 2110, a system memory 2125, a read-only memory 2130, a permanent storage device 2135, input devices 2140, and output devices 2145.

The bus 2105 collectively represents all system, peripheral, and chipset buses that communicatively connect the numerous internal devices of the computer system 2100. For instance, the bus 2105 communicatively connects the processing unit(s) 2110 with the read-only memory 2130, the system memory 2125, and the permanent storage device 2135.

From these various memory units, the processing unit(s) 2110 retrieve instructions to execute and data to process in order to execute the processes of the invention. The processing unit(s) may be a single processor or a multi-core processor in different embodiments. The read-only-memory (ROM) 2130 stores static data and instructions that are needed by the processing unit(s) 2110 and other modules of the computer system. The permanent storage device 2135, on the other hand, is a read-and-write memory device. This device is a non-volatile memory unit that stores instructions and data even when the computer system 2100 is off. Some embodiments of the invention use a mass-storage device (such as a magnetic or optical disk and its corresponding disk drive) as the permanent storage device 2135.

Other embodiments use a removable storage device (such as a flash drive, etc.) as the permanent storage device. Like the permanent storage device 2135, the system memory 2125 is a read-and-write memory device. However, unlike storage device 2135, the system memory is a volatile read-and-write memory, such a random access memory. The system memory stores some of the instructions and data that the processor needs at runtime. In some embodiments, the invention's processes are stored in the system memory 2125, the permanent storage device 2135, and/or the read-only memory 2130. From these various memory units, the processing unit(s) 2110 retrieve instructions to execute and data to process in order to execute the processes of some embodiments.

The bus 2105 also connects to the input and output devices 2140 and 2145. The input devices enable the user to communicate information and select commands to the computer system. The input devices 2140 include alphanumeric keyboards and pointing devices (also called "cursor control devices"). The output devices 2145 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 21, bus 2105 also couples computer system 2100 to a network 2165 through a network adapter (not shown). In this manner, the computer can be a part of a network of computers (such as a local area network ("LAN"), a wide area network ("WAN"), or an Intranet, or a network of networks, such as the Internet. Any or all components of computer system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 2, 6, 8, 9, 11, 12, 13, 18, and 20) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method of connecting machines of a first network in a data center to a second network external to the data center, the method comprising:
assigning first and second sets of machines to first and second traffic groups that are associated with first and second gateways;
controlling, by a controller, the first network to route first traffic from the first set of machines to the first gateway and second traffic from the second set of machines to the second gateway;
based on statistics regarding data message load on the first gateway, the statistics including bandwidth use of the first gateway by the first set of machines and an amount of the bandwidth each of the first set of machines uses, identifying by the controller a first machine to reassign from a first traffic group to the second traffic group;
reassigning the first machine to the second traffic group to reduce data message load on the first gateway; and
controlling, by the controller, the first network to route third traffic from the first machine to the second gateway.

2. The method of claim 1, wherein the first machine has a first priority higher than a second priority of another machine in the first traffic group, the other machine continuing to be assigned to the first traffic group after reassignment of the first machine to the second traffic group.

3. The method of claim 2 further comprising, before identifying the first machine, receiving a specification that the first machine has the first priority.

4. The method of claim 3, wherein the specification further specifies one or more other machines of the first network having the first priority.

5. The method of claim 4, wherein:
identifying the first machine comprises:
identifying a second machine of the first traffic group as having the first priority; and
determining that the second traffic group has enough available bandwidth for the first machine but not the second machine such that only the first machine can be reassigned to the second traffic group without overloading the second gateway.

6. The method of claim 5, wherein the second machine continues to be assigned to the first traffic group.

7. The method of claim 1 further comprising, before identifying the first machine and based on the statistics regarding the data message load on the first gateway, determining that a first predicted future load on the first gateway exceeds a particular threshold.

8. The method of claim 7, wherein the statistics regarding the data message load on the first gateway is a first set of statistics and the predicted future load on the first gateway is a first predicted future load, the method further comprising, before reassigning the first machine and based on a second set of statistics regarding data message load on the second gateway, determining that the second traffic group has available bandwidth such that a second predicted future load on the second gateway does not exceed the particular threshold even if the first machine uses the second gateway along with the second set of machines.

9. The method of claim 8 further comprising collecting the first and second sets of statistics, wherein determining that the first predicted future load on the first gateway comprises analyzing the first set of statistics to determine that the first predicted future load on the first gateway exceeds the particular threshold.

10. The method of claim 9, wherein collecting the first and second sets of statistics comprises collecting statistics associated with bandwidth usage of one or more particular uplink interfaces of the first and second gateways used to connect to the external second network.

11. The method of claim 10, wherein each of the first and second gateways comprises a Tier-0 (T0) gateway and a Tier-1 (T1) gateway, and the one or more particular uplink interfaces are one or more particular uplink interfaces of the T0 gateways.

12. The method of claim 9, wherein analyzing the first set of statistics comprises using the first set of statistics to perform predictive modeling computations to predict the first predicted future load on the first gateway.

13. The method of claim 9, wherein determining that the second traffic group has available bandwidth comprises analyzing the second set of statistics to determine that the second set of machines uses less than a total bandwidth provisioned for the second gateway.

14. The method of claim 13, wherein determining that the second traffic group has available bandwidth further comprises:
identifying a first bandwidth utilization of the second set of machines;
identifying a second bandwidth utilization of the first machine; and
summing the first and second bandwidth utilizations to determine that the second predicted future load on the second gateway does not exceed the particular threshold even if the first machine use the second gateway along with the second set of machines.

15. The method of claim 9, wherein collecting the first and second sets of statistics comprises retrieving the first and second sets of statistics from a data store.

16. The method of claim 15 further comprising:
before retrieving the first and second sets of statistics:
iteratively collecting subsets of statistics for the first and second gateways and the first and second sets of machines at specified time intervals; and
storing the collected subsets of statistics in the data store, wherein the first and second sets of statistics comprise the subsets of statistics.

17. The method of claim 1, wherein the machines are virtual machines (VMs) executing on a plurality of host computers in the first network.

18. The method of claim 1, wherein the first network is a cloud datacenter and the external second network is an on-premises datacenter comprising a plurality of on-premises machines.

19. The method of claim 18, wherein the cloud datacenter and the on-premises datacenter are respectively first and second software defined datacenters (SDDCs).

20. A non-transitory machine readable medium storing a program for execution by at least one processing unit for connecting machines of a first network in a data center to a second network external to the data center, the program comprising sets of instructions for:
assigning first and second sets of machines to first and second traffic groups that are associated with first and second gateways;
controlling, by a controller, the first network to route first traffic from the first set of machines to the first gateway and second traffic from the second set of machines to the second gateway;
based on statistics regarding data message load on the first gateway, the statistics including bandwidth use of the first gateway by the first set of machines and an amount of the bandwidth each of the first set of machines uses, identifying by the controller a first machine to reassign from a first traffic group to the second traffic group;

reassigning the first machine to the second traffic group to reduce data message load on the first gateway; and controlling, by the controller, the first network to route third traffic from the first machine to the second gateway.

\* \* \* \* \*